(12) United States Patent
Itoh

(10) Patent No.: US 7,266,364 B2
(45) Date of Patent: Sep. 4, 2007

(54) WIRELESS COMMUNICATIONS UNAUTHORIZED USE VERIFICATION SYSTEM

(75) Inventor: Yayoi Itoh, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 201 days.

(21) Appl. No.: 11/007,150

(22) Filed: Dec. 8, 2004

(65) Prior Publication Data

US 2006/0009195 A1 Jan. 12, 2006

(30) Foreign Application Priority Data

Jul. 9, 2004 (JP) ............... 2004-203895

(51) Int. Cl.
*H04M 1/66* (2006.01)
*H04M 1/68* (2006.01)
*H04M 3/16* (2006.01)

(52) U.S. Cl. ............... 455/410; 455/432.2; 455/456.2; 379/114.14; 379/189

(58) Field of Classification Search ............... 455/410, 455/411, 414.3, 456.2, 432.2; 379/189, 114.14
See application file for complete search history.

(56) References Cited

U.S. PATENT DOCUMENTS

| | | | |
|---|---|---|---|
| 5,748,632 A * | 5/1998 | Honda et al. ............... | 370/399 |
| 5,839,063 A | 11/1998 | Lee | |
| 6,259,934 B1 * | 7/2001 | Guerlin ............... | 455/566 |
| 6,466,777 B1 * | 10/2002 | Urita ............... | 455/410 |
| 2001/0048745 A1 | 12/2001 | Sheymov et al. | |

FOREIGN PATENT DOCUMENTS

| | | |
|---|---|---|
| EP | 0 884 919 | 12/1998 |
| EP | 0884919 A2 * | 12/1998 |
| EP | 1 209 935 | 5/2002 |
| JP | 07-046661 | 2/1995 |
| JP | 08-336183 | 12/1996 |
| JP | 09-116957 | 5/1997 |
| JP | 09-163447 | 6/1997 |
| JP | 09-322251 | 12/1997 |
| JP | 10-164656 | 6/1998 |
| JP | 10-191457 | 7/1998 |
| JP | 10-304444 | 11/1998 |
| JP | 10-336744 | 12/1998 |
| JP | 2000-184447 | 6/2000 |
| JP | 2000-354272 | 12/2000 |
| JP | 2001-025067 | 1/2001 |
| JP | 2001-320764 | 11/2001 |
| JP | 2002-247654 | 8/2002 |

* cited by examiner

*Primary Examiner*—Joseph Feild
*Assistant Examiner*—Inder Pal Mehra
(74) *Attorney, Agent, or Firm*—Katten Muchin Rosenman LLP

(57) ABSTRACT

A subscriber determines and verifies using a simple and reliable unit whether or not unauthorized use such as cloning, etc. A fraud audit mode (fraud detection mode, fraud verification mode, and fraud stop mode) is provided on the subscriber data of the HLR in the UE and the core network, and detect, verifies, and stops illegal use in the wireless communications depending on the mode.

24 Claims, 17 Drawing Sheets

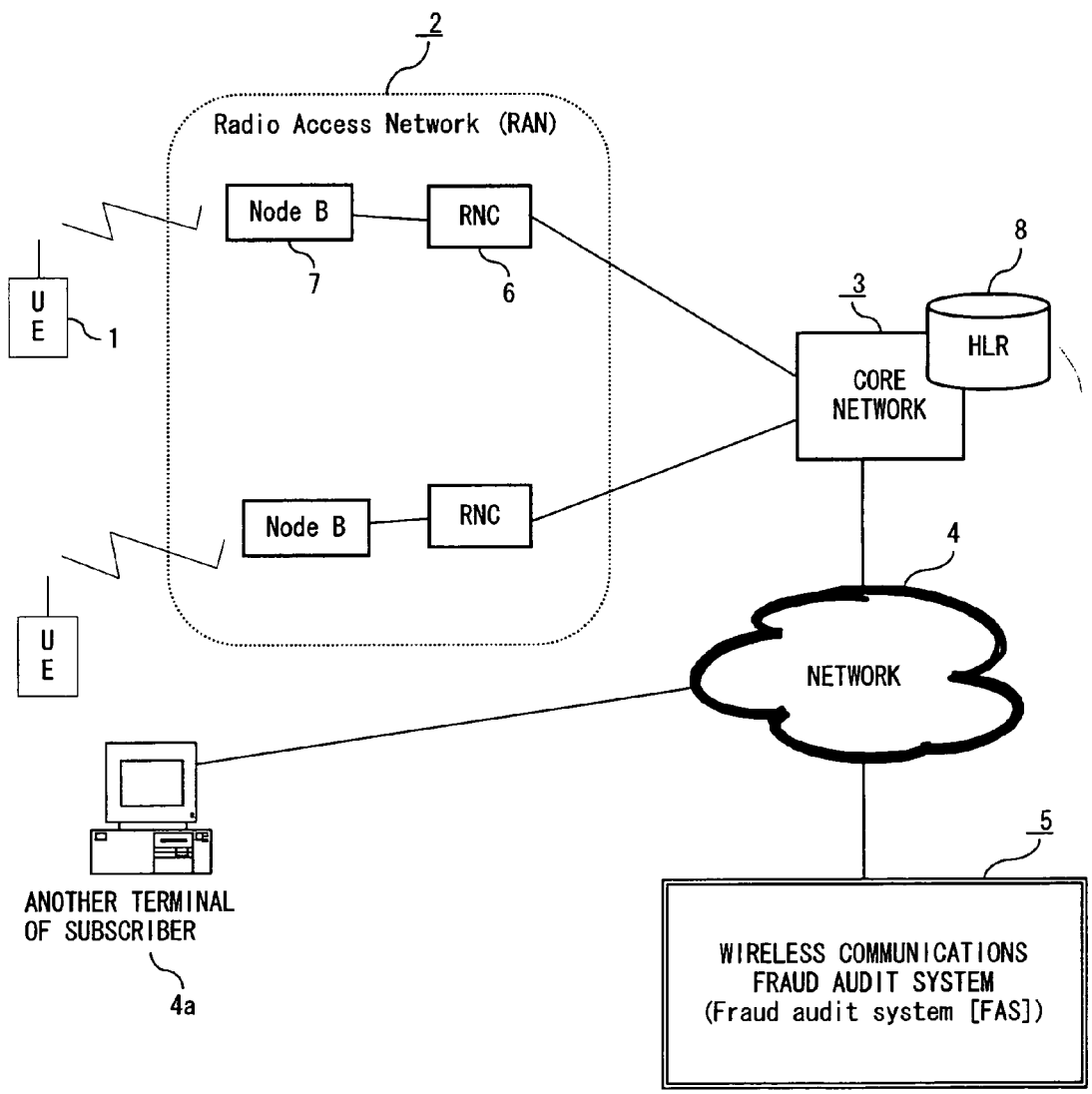
F I G. 1

| FRAUD AUDIT MODE | | MODE SETTING INFORMATION | ABSTRACT OF PROCESSES |
|---|---|---|---|
| M0 | NO FRAUD AUDIT FUNCTION | 1) HLR<br>2) PORTABLE TERMINAL | Default |
| M1 | FRAUD DETECTION MODE | HLR | WHEN FRAUD IS DETECTED IN CORE NETWORK, M1 IS AUTOMATICALLY SET. |
| M2 | FRAUD VERIFICATION MODE | 1) HLR<br>2) PORTABLE TERMINAL | AUTHORIZED USER REQUESTS CARRIER TO VERIFY PRESENCE/ABSENCE OF UNAUTHORIZED USER BY REFERRING TO HIGH-VALUE BILLING, ETC. |
| M2+ | FRAUD STOP MODE FOR STOPPING ILLEGAL CALL ONLY | HLR | WHEN UNAUTHORIZED USER IS CONFIRMED, M2 IS AUTOMATICALLY SET IN CORE NETWORK FROM M2. |
| M3 | FRAUD VERIFICATION (M2) AND TERMINAL INFORMATION COMPARISON MODE | 1) HLR<br>2) PORTABLE TERMINAL | AUTHORIZED USER REQUESTS CARRIER TO VERIFY PRESENCE/ABSENCE OF UNAUTHORIZED USER BY REFERRING TO HIGH-VALUE BILLING, ETC. |
| M3+ | FRAUD STOP (M2+) AND TERMINAL INFORMATION CHECKING MODE FOR STOPPING ILLEGAL CALL ONLY | 1) HLR | WHEN UNAUTHORIZED USER IS CONFIRMED, M3 IS AUTOMATICALLY SET IN CORE NETWORK FROM M3. |

FIG. 9

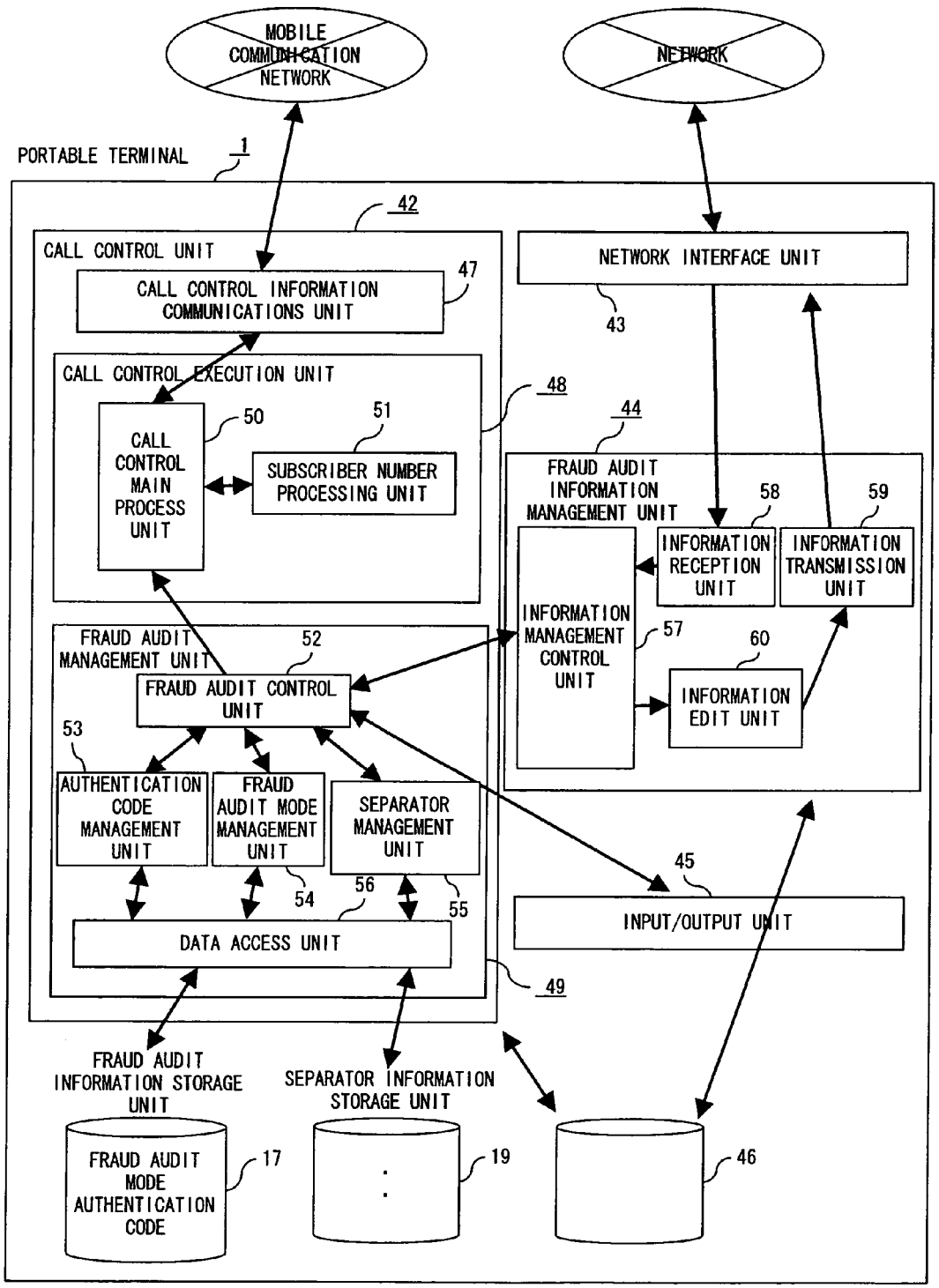
F I G. 16

WIRELESS COMMUNICATIONS UNAUTHORIZED USE VERIFICATION SYSTEM

BACKGROUND OF THE INVENTION

1. Field of the Invention

The present invention relates to a wireless communications system having a mobile communications network, a portable terminal, etc.

2. Description of the Related Art

In a wireless communications system, there has been the problem that a portable terminal device and its data are illegally copied for use in communications, that is, the problem of a clone terminal, etc.

Generally, a method for preventing illegal communications using a clone terminal can be 1) a method of communicating by an authenticating system of preventing communications from a clone terminal, 2) a method of detecting illegal communications using a clone terminal by comparing information during the communications by a network of wireless communications provided with specific information (for example, final position information, communications frequency, etc.) and a portable terminal, and 3) a method of searching for a clone terminal in a network of the wireless communications.

A method for communications by an authenticating system of preventing communications using a clone terminal is disclosed by, for example, Japanese Patent Laid-open Publication No. Hei 10-164656 describing a method of generating a new authentication key according to an authentication key assigned in advance and the history information about the past use status of a portable terminal, and changing the authentication key for each call. Japanese Patent Laid-open Publication No. 2003-534747 discloses a method of using a currently valid identifier for communications between devices by determining a set of secret identifiers known only by the base station for identification and authentication in controlling the communications between a common carrier and a cellular telephone, and using these secret identifiers. Japanese Patent Laid-open Publication No. Hei 10-336744 discloses a method of authenticating an authorized subscriber by a mobile station selecting an encrypted key number from among a plurality of encrypted key numbers of the mobile station at an instruction of a base station using a first random number, and transmitting the selected encrypted key number to the base station together with a second random number indicating the encryption key, and the base station comparing the encryption key specified by the base station using the first random number with the encryption key specified by the mobile station using the second random number, and authenticating the subscriber only when a matching result is obtained.

A method for detecting illegal communications using a clone terminal, etc. by a network of a wireless communications and a portable terminal provided with specific information comparing the information during communications is discloses by the following patent literature. For example, Japanese Patent Laid-open Publication No. Hei 08-336183 disclosed a method of comparing the communications frequency stored in a terminal and a center during communications before starting conversation, determining a terminal indicating a non-matching result as a clone terminal, and rejecting communications after determining the clone terminal. Japanese Patent Laid-open Publication No. Hei09-322251 discloses a method of storing last received telephone number, etc. as information together with position information about a mobile terminal, comparing the information stored in the subscriber data memory with the information stored in the memory of the mobile terminal during registering position information or issuing a call, and determining a clone terminal when a non-matching result is obtained. Japanese Patent Laid-open Publication No. Hei 10-191457 discloses a method of storing a communications history specific to the communications in the non-volatile memory of both mobile unit and base station when the mobile unit and the base station enter communications, etc., comparing the communications histories of both mobile unit and base station, and determining the presence of an unauthorized mobile terminal. Japanese Patent Laid-open Publication No. Hei 10-304444 discloses a method of storing the use time, etc. of the previous call of the database switching unit connected to a mobile terminal and a mobile communications switching node, the mobile communications switching node comparing the use time or the use period in the respective previous calls when the mobile terminal makes a call, and authenticating the mobile terminal when a matching result is obtained. Japanese Patent Laid-open Publication No. 2000-354272 discloses a method of providing a call record unit for a mobile terminal, transmitting call data recorded in the mobile terminal to a call data processing device provided for a mobile communications system, the call data processing device comparing the call data of the mobile communications system stored in a home location register with the transmitted call data of the mobile terminal, and determining an unauthorized mobile terminal and rejecting it. Japanese Patent Laid-open Publication No. 2001-320764 discloses status information stored in a portable communications terminal and a switching node, a terminal status information update device for updating the status information stored in the portable communications terminal based on a communications time, a switching node status information update device for updating status information stored in the switching node based on a communications time, and an authentication device for determining whether or not communications are to be permitted according to the status information stored in the portable communications terminal and the status information stored in the switching node.

The method for searching for a clone terminal in the network for wireless communications is disclosed by the following patent literature. For example, Japanese Patent Laid-open Publication No. Hei 07-046661 discloses a method of detecting the presence of a clone by transmitting a call connection request by a mobile station having the same identification number as a mobile station having a specific identification number, and further anticipating the presence of a clone according to the position and the time information at the previous call connection request, and based on the calculation result of the moving speed of a mobile station according to the position information and the time information at the current call connection request. Japanese Patent Laid-open Publication No. Hei 09-116957 discloses the invention relating to a fraud prevention apparatus including a central database capable of storing use threshold data of a wireless communications subscriber, with the use threshold data being configured by, for example, call hold time data, call frequency data, exclusive geographic position data, and an arbitrary combination of any of them, and a corresponding processor automatically performing the termination of a wireless service when calling a corresponding subscriber and detecting unauthorized use if a illegal action is detected. Japanese Patent Laid-open Publication No. Hei 09-163447 disclosed the invention of checking mobile station designation information, obtained by a mobile station designation unit in a call processing unit, from a mobile station by a mobile station authentication check unit, determining the correctness of the mobile station based on a check result, and switching the call connection of the mobile station to a base station management terminal by a call connection switching unit controlled by a call processing unit when the mobile station is not authenticated. Japanese Patent Laid-open Publication No. 2000-18444 discloses the invention of regarding that only the base station information last position registered remains regardless of an authenticated mobile terminal or a clone terminal when position registration is performed for report to a system where the mobile terminal is located for use in a call receiving process by a mobile terminal, and when there are a plurality of mobile terminals having the same phone numbers, and comparing the position registration information with the calling base station information . Japanese Patent Laid-open Publication No. 2001-025067 discloses the invention of comprising a PHS switch device for determining whether or not the area number of a base station in an area of a calling mobile terminal matches the position registration area number based on the terminal number of the calling mobile terminal when there is a call from the mobile terminal having the same terminal number as an authorized mobile terminal and authentication information, and a PS terminal data management device for notifying a maintainer of the possibility of illegal use of the calling mobile terminal as a clone terminal when the determination indicates a non-matching result. Japanese Patent Laid-open Publication No. 2002-247654 discloses the method of detecting an unauthorized use as a secondary index of a unauthorized use about the data relating to an unsuccessful authenticating process on an access type, an authentication retrial, a server address, etc. in a mobile communications network of the third generation.

A well-known publication for detecting a clone on the user side can be, for example, Japanese Patent Laid-open Publication No. Hei 11-075265 which discloses a method of storing data for recognizing first wireless access using a subscriber account in a database, and transferring stored data for recognition of the first access to a wireless device during the second wireless access using the same subscriber account, thereby allowing a subscriber to review the data and determine whether or not the previous access has been authenticated.

In the mechanisms of the above-mentioned well-known technologies, when the possibility of a clone terminal is detected by a switching center and the system, the processes of 1) rejecting a call, 2) forcibly connecting a call to a administrator terminal, 3) notifying a subscriber or a maintainer, 4) prompting to input a password and rejecting the call if a non-matching result is output, and 5) stopping the subsequent services automatically or by a subscriber determination are performed. These mechanisms are those of detecting and stopping a clone performed on the side of a carrier.

Although a subscriber does not commit any fraud, he or she can receive unreasonable treatment such as a call of the subscriber being rejected, forced to be connected to a administrator terminal, forced to be rejected in receiving a service, etc.

A well-known technology of searching for a clone on the user side can be Japanese Patent Laid-open Publication No. Hei 11-075265. However, since previous use information is transmitted from a system each time a subscriber tries access by making a call, etc., it is necessary for the subscriber to confirm the received information. Thus, the operation is a nuisance, and the confirming operation depends on the memory of the user. Therefore, the cloning can be overlooked.

If there is the possibility that a user suffers cloning as a result of an illegal call which has passed through the clone detecting function of the above-mentioned techniques disclosed by the patent literature listed above, and reception of an outrageous bill, then the user has to consult with an organization such as Japan Information Preservation Association which is an NPO, etc. or use the "predetermined amount attainment notification service" and the "rate information service" recommended by a carrier from which a user of a portable terminal receives an outrageous bill so that the user can periodically check the billing statement information to confirm there is no unreasonable billing for the communications not performed by the user.

When suspicious billing statement information is found, it is necessary for a user to confirm whether or not the corresponding terminal was used at the time in problem because the billing statement information contains only the date and time, the communications time, and the communications rate. Therefore, although the terminal was not used at the time in problem, it is necessary to prove that it was not used at the time in problem.

Relating to a suspicious high-value billing, there is another possibility of an accident other than an attack by a clone terminal. That is, there can be the possibility of "wrong memory of a user" (when a user has forgotten about the actual use) or "wrong billing by a carrier", but a user has no means for determining or proving that the accident has come from wrong memory, wrong billing, or cloning.

There is also the possibility that a user files a lawsuit for a refund of the paid amount from the carrier on a large amount of suspicious packet rate billing. In such a worst case, a user requires laborious action to prepare the definite evidence, file a lawsuit, etc.

SUMMARY OF THE INVENTION

The present invention has been developed to solve the above-mentioned problems, and aims at providing a method of a user easily and definitely determining and proving whether a high-value billing received by a user relates to wrong memory, wrong billing, or cloning.

To attain the above-mentioned objective, the fraud verification apparatus according to the present invention includes:

an abnormality detection unit for detecting abnormal communications by a portable terminal for performing wireless communications;

a subscriber information storage unit for storing information about a subscriber of a wireless communications system;

an abnormality notification unit for notifying a subscriber of the wireless communications system of the detection of abnormal communications when the abnormal communications are detected by the abnormality detection unit; and a fraud verification unit for verifying whether or not the abnormal communications detected by the abnormality detection unit at a request from the subscriber are the communications based on an illegal call according to a comparison result between call control information generated and transmitted when the portable terminal makes a call and information about the subscriber stored in the subscriber information storage unit, and notifying the subscriber of the verification result.

The fraud verification apparatus according to the present invention includes:

a first storage unit for storing first call control information generated and transmitted by a first portable terminal for performing wireless communications when the first portable terminal makes a call;

a second storage unit for storing second call control information generated when a call from the second portable terminal is received; and a fraud verification unit for comparing at a request from a subscriber of the wireless communications system call control information stored in the first storage unit with call control information stored in the second storage unit, verifying based on the comparison result whether or not abnormal communications are performed, and notifying the subscriber of the verification result.

To attain the above-mentioned objective, the portable terminal according to the present invention is a portable terminal for performing wireless communications in a wireless communications system for detecting abnormal communications including:

a storage unit for storing information about the portable terminal including at least position registration information and first call control information generated when a call is made by the terminal; and a transmission unit for detecting abnormal communications by the portable terminal and transmitting information about the portable terminal stored in the storage unit to the fraud verification apparatus storing the information about a subscriber of the wireless communications system, and the fraud verification apparatus compares the first call control information notified by the transmission unit with second call control information generated by the fraud verification apparatus based on a call made by the portable terminal, and it is verified based on the comparison result whether or not the detected abnormal communications are the communications by an illegal call, and the subscriber is notified of the comparison result.

To attain the above-mentioned objective, the fraud verifying method according to the present invention includes:

an abnormality detecting process of detecting abnormal communications by a portable terminal for performing wireless communications;

a subscriber information storing process of storing information about a subscriber of a wireless communications system;

an abnormality notifying process of notifying a subscriber of the wireless communications system of the detection of abnormal communications when the abnormal communications are detected in the abnormality detecting process; and a fraud verifying process of verifying whether or not the abnormal communications detected in the abnormality detecting process at a request from the subscriber are the communications based on an illegal call according to a comparison result between call control information generated and transmitted when the portable terminal makes a call and information about the subscriber stored in the subscriber information storing process, and notifying the subscriber of the verification result.

The method according to the present invention can also be a fraud verifying method including a fraud verifying process of comparing, at a request from a subscriber of the wireless communications system, first call control information generated when a first portable terminal makes a call and then transmitted with second call control information generated when a call is made by a second portable terminal, verifying whether or not there are illegal communications based on the comparison result, and notifying the subscriber of the verification result.

A fraud verifying method according to the present invention includes:

in a portable terminal for performing wireless communications in a wireless communications system for detecting abnormal communications including, a storing process of storing information about the portable terminal including at least position registration information and call control information generated when a call is made by the terminal; and a transmitting process of detecting abnormal communications by the portable terminal and transmitting information about the portable terminal stored in the storing process to the fraud verification apparatus storing the information about a subscriber of the wireless communications system, and the fraud verification apparatus compares the call control information notified in the transmitting process with second call control information generated by the fraud verification apparatus based on a call made by the portable terminal, and it is verified based on the comparison result whether or not the detected abnormal communications are the communications by an illegal call, and the subscriber is notified of the comparison result.

A program is used for the fraud verification apparatus to direct the CPU of the fraud verification apparatus to perform:

an abnormality detecting process of detecting abnormal communications by a portable terminal for performing wireless communications;

a subscriber information storing process of storing information about a subscriber of a wireless communications system;

an abnormality notifying process of notifying a subscriber of the wireless communications system of the detection of abnormal communications when the abnormal communications are detected in the abnormality detecting process; and a fraud verifying process of verifying whether or not the abnormal communications detected in the abnormality detecting process at a request from the subscriber are the communications based on an illegal call according to a comparison result between call control information generated and transmitted when the portable terminal makes a call and information about the subscriber stored in the subscriber information storing process, and notifying the subscriber of the verification result.

Additionally, a program is used for the fraud verification apparatus to direct the CPU of the fraud verification apparatus to perform:

a fraud verifying process of comparing, at a request from a subscriber of the wireless communications system, first call control information generated when a first portable terminal makes a call and then transmitted with second call control information generated when a call is made by a second portable terminal, verifying whether or not there are illegal communications based on the comparison result, and notifying the subscriber of the verification result.

Furthermore, a program is used for the portable terminal to direct the CPU of the portable terminal to perform:

in a portable terminal for performing wireless communications in a wireless communications system for detecting abnormal communications including, a storing process of storing information about the portable terminal including at least position registration information and call control information generated when a call is made by the terminal; and a transmitting process of detecting abnormal communications by the portable terminal and transmitting information about the portable terminal stored in the storing process to the fraud verification apparatus storing the information about a subscriber of the wireless communications system.

BRIEF DESCRIPTION OF THE DRAWINGS

FIG. 1 briefly shows an example of the configuration of the wireless communications according to an embodiment of the present invention;

FIG. 9 shows the mode of the wireless communications unauthorized use verification system according to an embodiment of the present invention;

FIG. 16 shows the configuration of the function of the UE according to an embodiment of the present invention.

DESCRIPTION OF THE PREFERRED EMBODIMENTS

Figure 2:
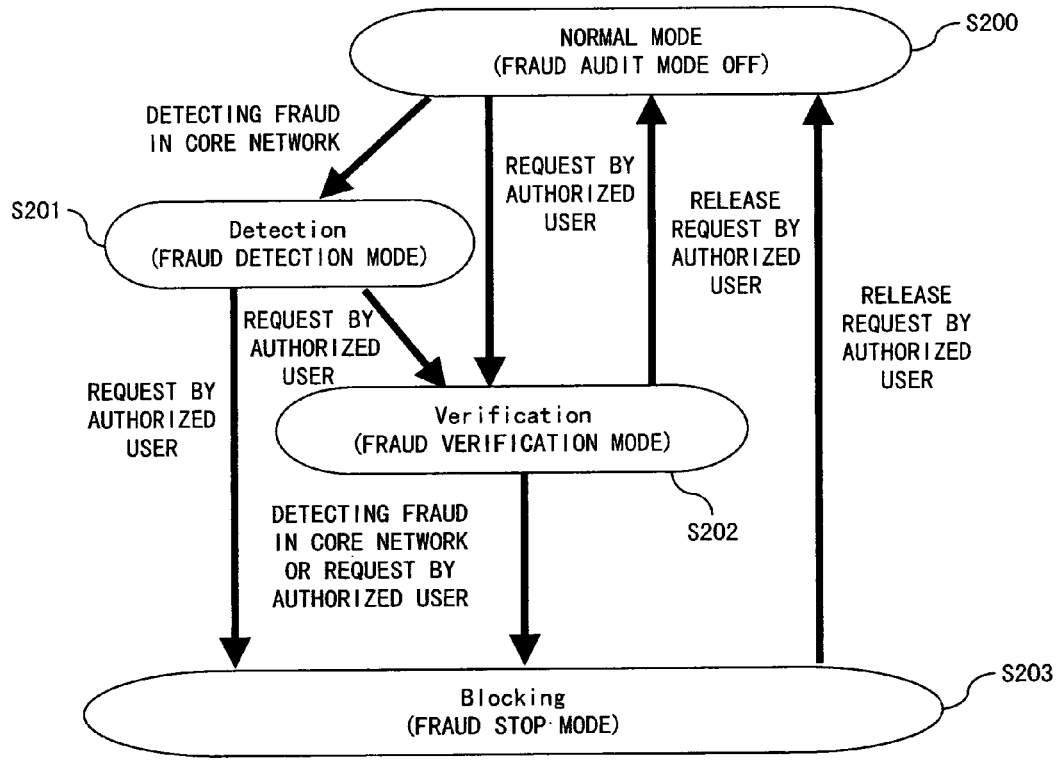
FIG. 2 shows the correlation of the fraud audit mode in the core network of the wireless communications unauthorized use verification system according to an embodiment of the present invention.

The invention according to claim 1 is a fraud verification apparatus according to the present invention includes: an abnormality detection unit for detecting abnormal communications by a portable terminal for performing wireless communications; a subscriber information storage unit for storing information about a subscriber of a wireless communications system; an abnormality notification unit for notifying a subscriber of the wireless communications system of the detection of abnormal communications when the abnormal communications are detected by the abnormality detection unit; and a fraud verification unit for verifying whether or not the abnormal communications detected by the abnormality detection unit at a request from the subscriber are the communications based on an illegal call according to a comparison result between call control information generated and transmitted when the portable terminal makes a call and information about the subscriber stored in the subscriber information storage unit, and notifying the subscriber of the verification result.

According to claim 1, at a request of a subscriber of the wireless communications system, if the communications based on a call made by a portable terminal are abnormal communications, the abnormality detection unit can detect it. Furthermore, the subscriber can easily verify through the fraud verification unit whether or not the detected abnormal communications are illegal communications, and can obtain the verification result.

The invention according to claim 2 is the fraud verification apparatus based on claim 1, wherein the fraud verification unit comprises a call record unit for comparing the information which is contained in the call control information and comprises a calling subscriber number, a separator, and an authentication code with the information which is contained in the information about the subscriber and comprises a calling subscriber number, a separator managed by the fraud verification apparatus and an authentication code managed by the fraud verification apparatus, performing the verification based on the comparison result, and recording the communications based on the illegal call when an illegal call is detected.

According to the invention based on claim 2, the fraud verification unit compares the information contained in the call control information and comprises a calling subscriber number, a separator, and an authentication code with the information managed by the fraud verification apparatus and comprises a separator and a authentication code. Thus, the subscriber can easily verify through the fraud verification unit whether or not the detected abnormal communications are illegal communications, and can obtain the verification result. Furthermore, the call record unit can easily record the illegal communications using the call record unit.

The invention according to claim 3 is a fraud verification apparatus comprising: a first storage unit for storing first call control information generated and transmitted by a first portable terminal for performing wireless communications when the first portable terminal makes a call; a second storage unit for storing second call control information generated when a call from the second portable terminal is received; and a fraud verification unit for comparing at a request from a subscriber of the wireless communications system call control information stored in the first storage unit with call control information stored in the second storage unit, verifying based on the comparison result whether or not abnormal communications are performed, and notifying the subscriber of the verification result.

According to the invention based on claim 3, the subscriber can allow the fraud verification unit to compare the call control information stored in the first storage unit with the call control information stored in the second storage unit, and can easily obtain a verification result about whether or not the communications are illegal communications according to the comparison result.

The invention according to claim 4 is a portable terminal for performing wireless communications in the wireless communications unauthorized use verification system, and comprises a storage unit for storing information about the portable terminal including at least position registration information and first call control information generated when a call is made by the terminal; and a transmission unit for detecting abnormal communications by the portable terminal and transmitting information about the portable terminal stored in the storage unit to the fraud verification apparatus storing the information about a subscriber of the wireless communications system, and the fraud verification apparatus compares the first call control information notified by the transmission unit with second call control information generated by the fraud verification apparatus based on a call made by the portable terminal, and it is verified based on the comparison result whether or not the detected abnormal communications are the communications by an illegal call, and the subscriber is notified of the comparison result.

According to the invention based on claim 4, the subscriber can allow the transmission unit to transmit the information about the portable terminal, and the fraud verification apparatus to compare the first call control information with the second call control information and verify whether or not the call is illegal, and can obtain the verification result.

The invention according to claim 5 based on claim 4 is a portable terminal for performing wireless communications in the wireless communications unauthorized use verification system, wherein the transmission unit transmits a calling subscriber number, a separator managed by the fraud verification apparatus, an authentication code stored in the storage unit to the fraud verification apparatus when a call is made for wireless communications, the fraud verification apparatus verifies whether or not the detected abnormal communications relate to an illegal call according to the information, and notifies the subscriber of the verification result.

According to the invention based on claim 5, the subscriber allows the transmission unit to transmit a calling subscriber number and a separator managed by the fraud verification apparatus and an authentication code, thereby allowing the fraud verification apparatus to perform verification using the separator and the authentication code, and obtaining the verification result.

Thus, to the present invention can provide means for a user to easily determine and prove whether the high-value billing is caused by wrong memory of the user, wrong billing of a carrier, or cloning.

Figure 3:
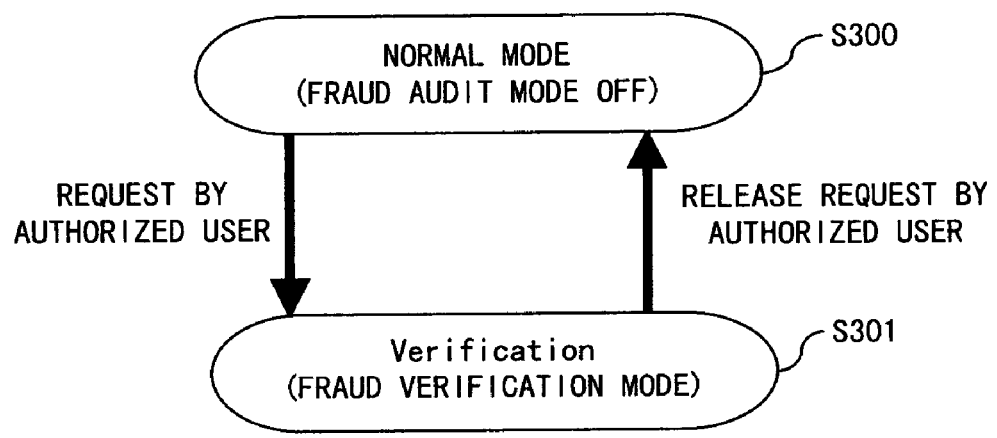
FIG. 3 shows the correlation of the fraud audit mode in the UE of the wireless communications unauthorized use verification system according to an embodiment of the present invention.
Figure 17:
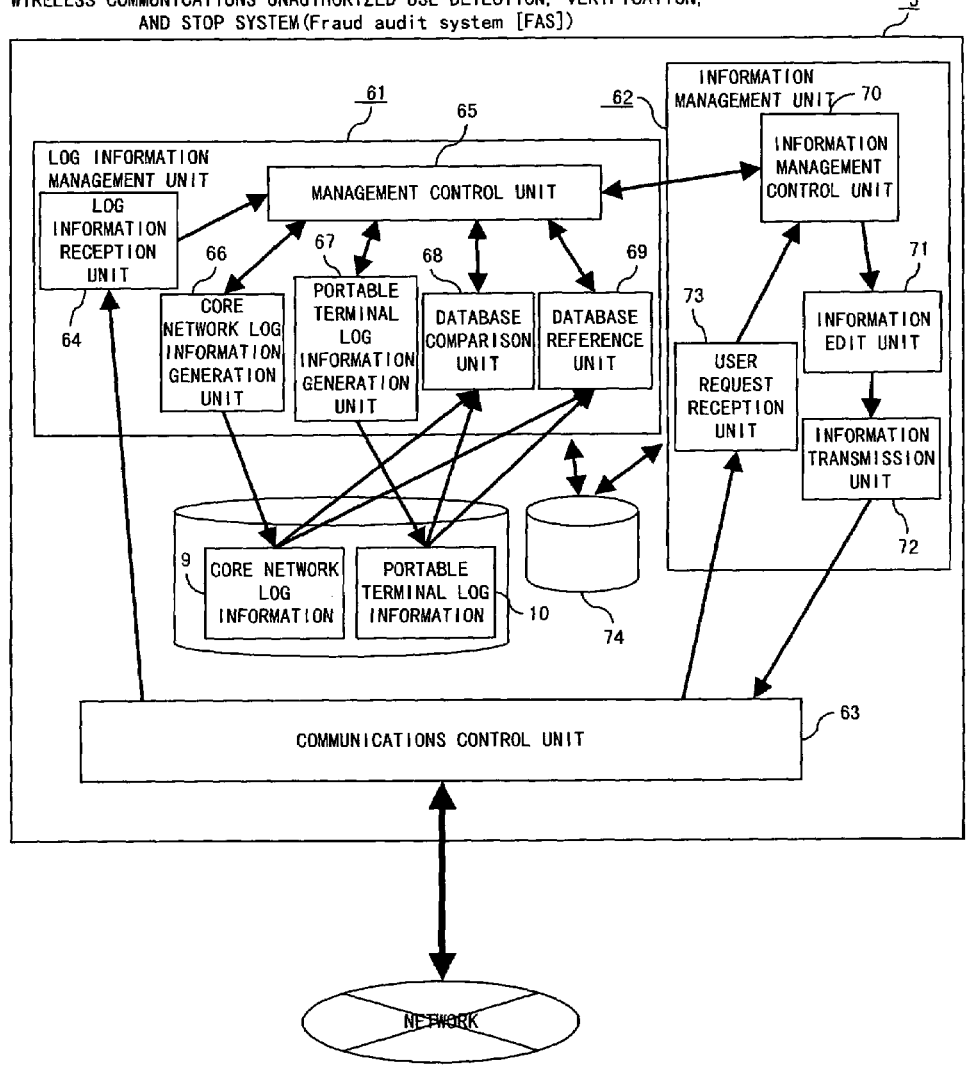
FIG. 17 shows the configuration of the function of the FAS according to an embodiment of the present invention.

The embodiments of the present invention are explained below by referring to FIGS. 1 through 17. FIG. 1 shows the outline of an example of the configuration of the wireless communications unauthorized use verification system according to an embodiment of the present invention, and FIGS. 2 and 3 shows the relationship among the four modes of the wireless communications unauthorized use verification system according to an embodiment of the present invention. FIGS. 4 through 8 show the concept of the operation of the wireless communications unauthorized use verification system. FIG. 9 shows the fraud audit mode used in an embodiment of the present invention. FIGS. 10 through 14 are flowcharts of the detailed processes. FIGS. 15 through 17 show the outline of the configuration of each element forming part of the wireless communications unauthorized use verification system.

FIG. 1 shows the outline of an example of the configuration of the wireless communications unauthorized use verification system according to an embodiment of the present invention.

The wireless communications unauthorized use verification system shown in FIG. 1 comprises: a user equipment (UE) 1 which is a portable terminal; a radio access network (RAN) 2; a core network 3 for establishing wireless communications with the UE 1 through the RAN 2; a network 4 such as the Internet, etc.; another terminal 4a of a subscriber connected to the network 4 for communications; and a wireless communications fraud audit system (FAS) 5 for trailing the wireless communications of the UE 1.

The UE 1 is a portable terminal for use in wireless communications, and is to be owned by a subscriber of a wireless communications system managed by the core network 3.

The RAN 2 comprises a radio network controller (RNC) 6 which is a wireless communications device for performing voice communications and packet communications with the UE 1 and a node B7 which is a wireless base station in the RAN 2.

The core network 3 is provided with a circuit switched (CS) network not shown in the attached drawings and a packet switched (PS) network.

For example, the CS network is provided with at least a mobile-services switching center (MSC) having a circuit switching function and a gateway MSC (GMSC) having a gateway function, and circuit switching is performed by the control of the CPU provided for the MSC not shown in the attached drawings during the voice communications, and the roaming position, etc. of the UE 1 during communications is registered in an home location resister (HLR) 8 and managed.

The PS network is provided with at least a serving GPRS (global packet radio service) support node (SGSN) having a packet switching function and a gateway GPRS support node (GGSN) having a gateway function, controls the communications of a PS call from the UE 1 under the control of the CPU not shown in the attached drawings but provided for the SGSN, and transmits and receives data to and from the RNC 6 and the GGSN.

Furthermore, the core network 3 comprises the HLR 8 for managing the information (for example, position information, etc.) about the UE 1.

The FAS 5 is connected to the core network 3 through the network 4 such as the Internet, etc., stores the call control information about the UE 1 and the call control information about the core network 3 for management of the consistency of each call control information.

The wireless communications unauthorized use verification system relating to the above-mentioned embodiments of the present invention has four modes including a fraud audit mode comprising the three modes of a fraud detection mode, a fraud verification mode, and a fraud stop mode, and a normal mode entered when the fraud audit mode is turned OFF.

The fraud detection mode is provided with an abnormality detection unit described in the scope of the claims for the patent. The fraud verification mode is provided with a fraud verification unit described in the scope of the claims for the patent. The fraud stop mode is provided with a fraud stop unit described in the scope of the claims for the patent.

The UE 1 explained above is, as explained by referring to FIG. 16, can realize the function shown in FIG. 16 by one or more CPUs provided in the UE 1 performing a process according to the program stored at a predetermined address in a storage unit 46. For simple explanation, the process performed by the CPU provided for the UE 1 is described below by mainly explaining the "UE 1".

The main components of the core network 3 are the MCS having a circuit switching function and the SGSN having a packet switching function. When a call from the UE 1 is a CS call, one or more CPUs not shown in the attached drawings but provided in the MCS perform a process according to the program stored at a predetermined address in a storage unit 24. When a call from the UE 1 is a PS call, one or more CPUs not shown on the attached drawings but provided in the SGSN perform a process according to the program stored at a predetermined address in the storage unit 24, thereby realizing the function shown in FIG. 15. However, for simple explanation, the process performed by the above-mentioned CPU provided for the MCS and the SGSN is described by mainly explaining the core "network 3".

Similarly, as explained by referring to FIG. 17, the FAS 5 can realize the function shown in FIG. 17 by one or more CPUs not shown in the attached drawings but are provided for the FAS 5 performing a process according to the program stored at a predetermined address in a storage unit 74. However, for simple explanation, the process performed by the above-mentioned CPU for the FAS 5 is described simply by describing the "FAS 5".

The configuration of the hardware of the UE 1 and the core network 3 can be a well-known hardware configuration disclosed by the above-mentioned patent literature (for example, Japanese Patent Laid-open Publication No. Hei 10-164656), and the hardware configuration of the FAS 5 can be a hardware configuration similar to a common information processing device.

FIGS. 2 and 3 show the correlation among the four modes of the wireless communications unauthorized use verification system according to the embodiments of the present invention.

FIG. 2 shows the correlation of the fraud audit mode in the core network 3.

As shown in FIG. 2, the core network 3 is provided with four modes, that is, the fraud detection mode, the fraud verification mode, the fraud stop mode, and the normal mode.

The core network 3 has the abnormality detecting function used commonly as a well-known technology, and switches from the normal mode S200 to the fraud detection mode S201 by the core network 3 changing the mode control information stored at a predetermined address of the HLR 8 when the abnormality detecting function detects an abnormality.

The fraud verification mode S202 can be switched by changing the mode control information stored at a predetermined address in the HLR 8 by, for example, an administrator, an operator, etc. of the core network 3 or the wireless communications unauthorized use verification system using an input unit (for example, a keyboard, a mouse, etc.) provided in an input/output unit 23 at a request from a subscriber (the owner of the UE 1 registered in the HLR 8 of the core network 3) when the core network 3 enters the normal mode S200 or the fraud detection mode.

When the core network 3 is in the fraud detection mode S201, the fraud stop mode S203 is switched by an administrator, etc. of the core network 3 or the wireless communications unauthorized use verification system at a request of a subscriber. When the core network 3 is in the fraud verification mode S202, it is switched by an administrator, etc. of the core network 3 of the wireless communications unauthorized use verification system at a request of a subscriber, or switched by the core network 3 when an abnormality is detected by the abnormality detecting function.

The fraud verification mode S202 and the fraud stop mode S203 are released at a request of a subscriber by an administrator, etc. of the core network 3 or the wireless communications unauthorized use verification system, and is switched to the normal mode S200 when the fraud verification mode S202 and the fraud stop mode S203 are released.

The mode control information for control of the above-mentioned four modes is stored with the information about the owner of the UE 1 in the HLR 8 of the core network 3. Therefore, when the administrator, etc. of the wireless communications unauthorized use verification system switches a mode, the mode control information registered in the HLR 8 by the input unit in the input/output unit 23 of the core network 3. When abnormality is detected by the abnormality detecting function, the core network 3 changes the mode control information registered at a predetermined address of the HLR 8.

FIG. 3 shows the correlation of the fraud audit mode in the UE 1.

As shown in FIG. 3, the UE 1 has two modes, that is, the normal mode and the fraud verification mode.

The fraud detection mode S301 is switched by an administrator, an operator, etc. of the core network 3 or the wireless communications unauthorized use verification system changing the mode control information stored at a predetermined address of the fraud audit information storage unit 17 at a request of a subscriber. The fraud detection mode S301 is also released by an operator, etc. of the wireless communications unauthorized use verification system at a request from a subscriber.

The mode control information for control of the above-mentioned two modes is stored in a fraud audit information storage unit 17 comprising a magnetic storage device or non-volatile memory (for example, EEPROM, etc.) in the UE 1, the operator, etc. rewrites the mode control information stored at a predetermined address directly or by connection to equipment having a dedicated interface.

As shown in FIG. 2 displaying the correlation of the fraud audit mode in the core network 3, when the UE 1 enters the fraud detection mode S301, the core network 3 enters either fraud verification mode S202 or fraud stop mode S203.

Figure 4:
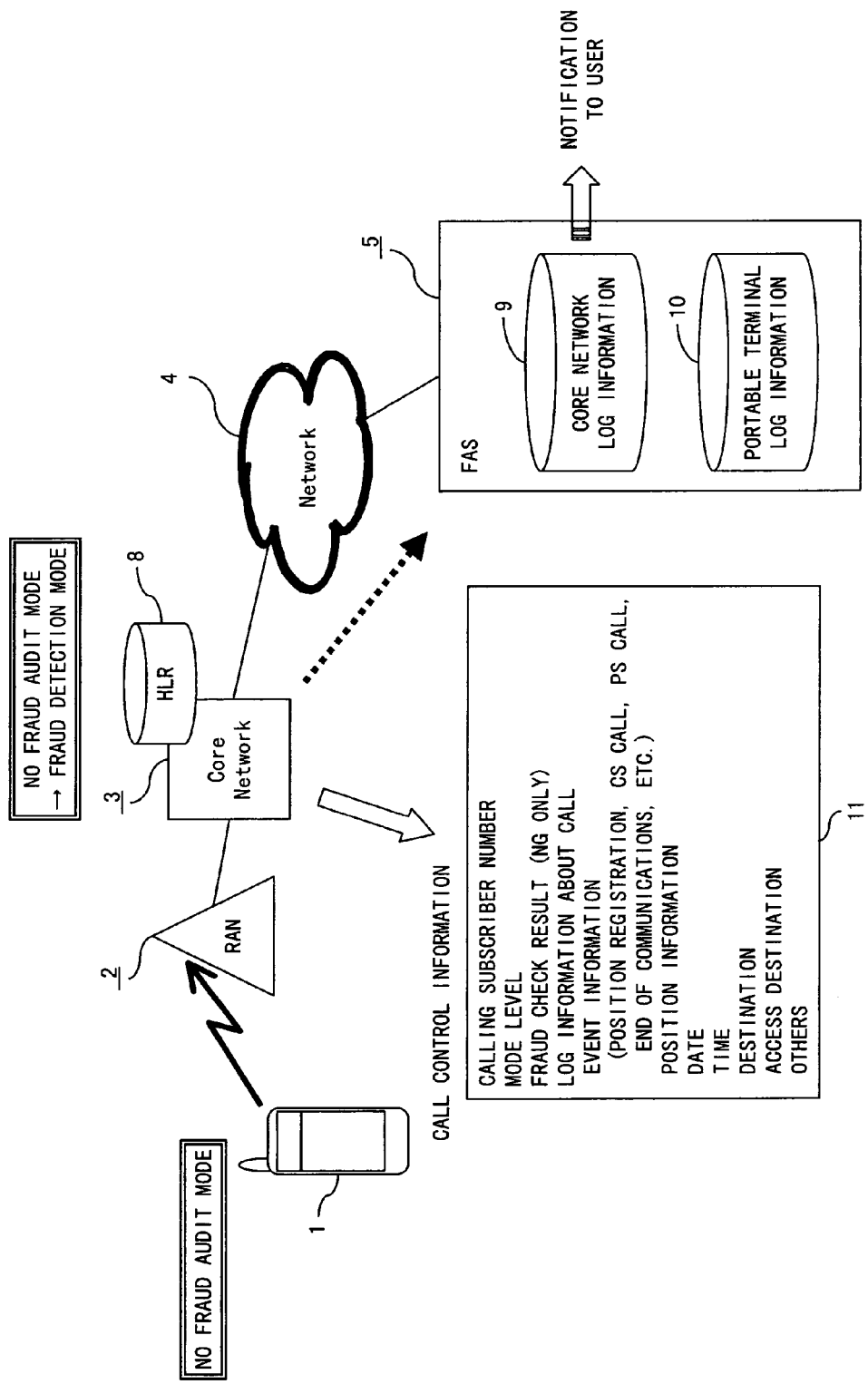
FIG. 4 shows the concept in the fraud detection mode of the wireless communications unauthorized use verification system according to an embodiment of the present invention.

FIG. 4 shows the concept when the wireless communications unauthorized use verification system according to the present embodiment is in the fraud detection mode.

Each component forming part of the wireless communications unauthorized use verification system shown in FIG. 4 comprises the UE 1, which is a portable terminal, the RAN 2 which is a wireless access network, the core network 3 for wireless communications with the UE 1 through the RAN 2, the network 4 such as the Internet, etc., and the FAS 5 for auditing the wireless communications of the UE 1 as shown in FIG. 1.

Although not shown in FIG. 1, the FAS 5 comprises at least a core network log information storage unit 9 storing the call control information about the core network 3 connected through the network 4, and a portable terminal log information storage unit 10 storing the call control information about the UE 1 transmitted through the core network 3 and the network 4 from UE 1.

The core network 3 has the abnormality detecting function by a commonly used well-known technology as shown in FIG. 2. When the abnormality detecting function detects abnormality, the normal mode is switched to the fraud detection mode.

In the fraud detection mode, when the core network 3 receives a call from the UE 1, it generates the information about the call (call control information 11), and transmits the information to the connected FAS 5 through the network 4.

As shown in FIG. 4, the call control information 11 includes all or a part of, for example, a calling subscriber number, a mode level indicating the fraud audit mode of the core network 3, a fraud check result as the information about abnormality when the abnormality is detected by the abnormality detecting function, and, as the log information about a call, event information (information indicating the purpose of a call, for example, the registration position, the CS call, the PS call, etc.), the registration position of the UE 1 when a call is issued, the date and time of the issue of a call, the time indicating the communications time, the destination of CS call, and the destination of PS call.

The calling subscriber number indicates the subscriber identifier including international mobile subscriber identity (IMSI), temporary mobile subscriber identity (TMSI), etc.

The FAS 5 stores the call control information 11 transmitted from the core network 3 in the core network log information storage unit 9, and manages it for each subscriber. Then, the FAS 5 reads the fraud check result from the call control information 11 stored in the core network log information storage unit 9, and checks whether or not the core network 3 has detected abnormality.

If the core network 3 has detected abnormality, for example, the FAS 5 displays on the display unit (not shown in the attached drawings) the information that the abnormality has been detected to allow the operator to recognize the detection of the abnormality, and the operator notifies the subscriber of the information.

Figure 5:
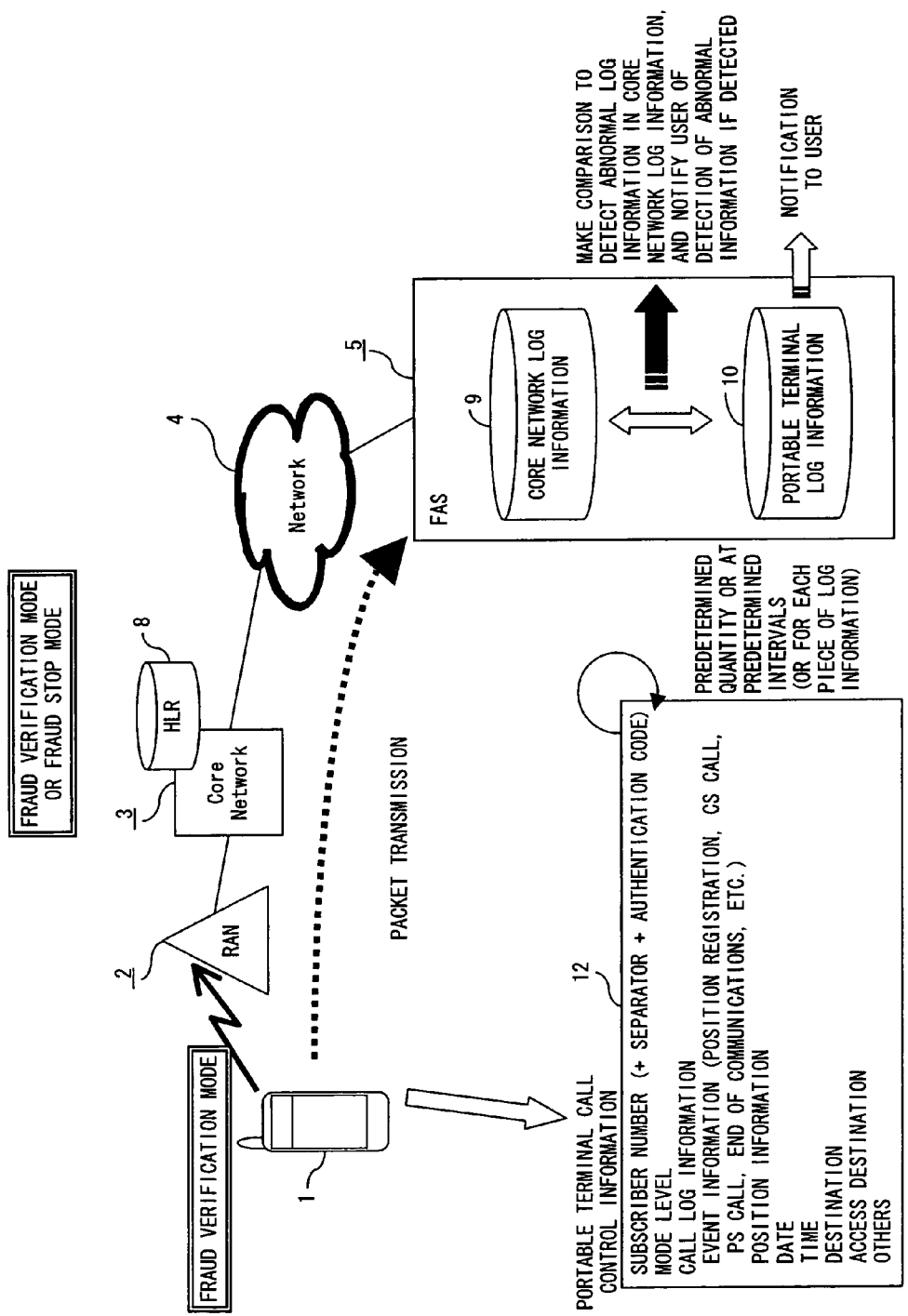
FIG. 5 shows the concept of the call control information collecting process of the UE in the fraud verification mode or the fraud stop mode of the wireless communications unauthorized use verification system according to an embodiment of the present invention.

FIG. 5 shows the concept of the process of collecting call control information 12 when the wireless communications unauthorized use verification system according to an embodiment of the present invention enters the fraud verification mode or the fraud stop mode.

When the wireless communications unauthorized use verification system shown in FIG. 5 enters the fraud verification mode or the fraud stop mode, the fraud audit mode of the UE 1 enters the fraud verification mode (because the operation of the UE 1 in the fraud verification mode is the same as the operation of the UE 1 in the fraud stop mode in the wireless communications unauthorized use verification system).

When the UE 1 is in the fraud verification mode, the UE 1 generates the information about a call (hereinafter referred to as the portable terminal call control information 12) when it makes a call, and stores the information in the storage unit 46 (for example, non-volatile memory such as a magnetic storage device, EEPROM, etc.) forming part of the UE 1.

The call control information 12 stored in the storage unit 46 is read from a predetermined address of the storage unit 46 by the UE 1 according to the dedicated application software operable on a portable terminal, and transmitted to the FAS 5 through the core network 3 in the PS communications.

As shown in FIG. 5, the call control information 12 includes at least, for example, a calling subscriber number with a separator and authentication code, a mode level indicating the fraud audit mode of the core network 3, and, as the log information about a call, event information (information indicating the purpose of a call, for example, the registration position, the CS call, the PS call, etc.), the registration position of the UE 1 when a call is issued, the date and time of the issue of a call, the time indicating the communications time, the destination of CS call, and the destination of PS call.

The separator refers to a character string of a combination of one or more symbols other than an alphanumeric character, or a character string of a combination of one or more symbols including alphanumeric characters based on a predetermined rule. The number of digits of the character string is variable. For example, when a character string is a combination of one or more symbols other than an alphanumeric character, it can be "#*#", "#", "¥*", etc., and when a character string of a combination of one or more symbols including alphanumeric characters based on a predetermined rule, it can be "*99*", etc. with the rule of containing no alphanumeric characters at both ends defined.

In the present embodiment, four numeric digits are used for an authentication code. However, for example, one or more alphanumeric characters can be combined into a character string, or one or more alphanumeric characters including symbols can be combined into a character string. That is, it is only important that the difference between a character string from a separator can be definitely recognized.

The separator and the authentication code of the above-mentioned call control information 12 are registered in the HLR 8 by an administrator or an operator of the wireless communications unauthorized use verification system or the core network 3, and simultaneously registered in the storage unit 46 of the UE 1.

Therefore, when the UE 1 generates the call control information 12, the UE 1 reads predetermined separator and authentication code from a predetermined address of the fraud audit information storage unit 17 and the separator information storage unit 19, and adds them to the calling subscriber number, thereby generating the call control information 12.

The FAS 5 stores the call control information 12 transmitted from the UE 1 in the portable terminal log information storage unit 10. In the fraud verification mode or the fraud stop mode shown in FIG. 6, call control information 13 (refer to FIG. 6) generated by the core network 3 in response to a call of the UE 1 is transmitted from the core network 3 to the FAS 5 through the network 4, and is stored in the core network log information storage unit 9.

The FAS 5 compares the call control information 13 stored in the core network log information storage unit 9 with the call control information 12 stored in the portable terminal log information storage unit 10, and performs the process of checking whether or not there is abnormal log information in the respective log information.

That is, the FAS 5 reads the call control information 13 from a predetermined address in the core network log information storage unit 9, and reads the call control information 12 from a predetermined address of the portable terminal log information storage unit 10. If it compares the read data, and a non-matching result is output, then it is determined that abnormality has been detected, the FAS 5 notifies an administrator (or an operator), etc. of the FAS 5 of the information that abnormality has been detected displayed on the display unit not shown in the attached drawings but provided for the FAS 5, and the operator notifies the subscriber of the information that abnormality has been detected.

Figure 6:
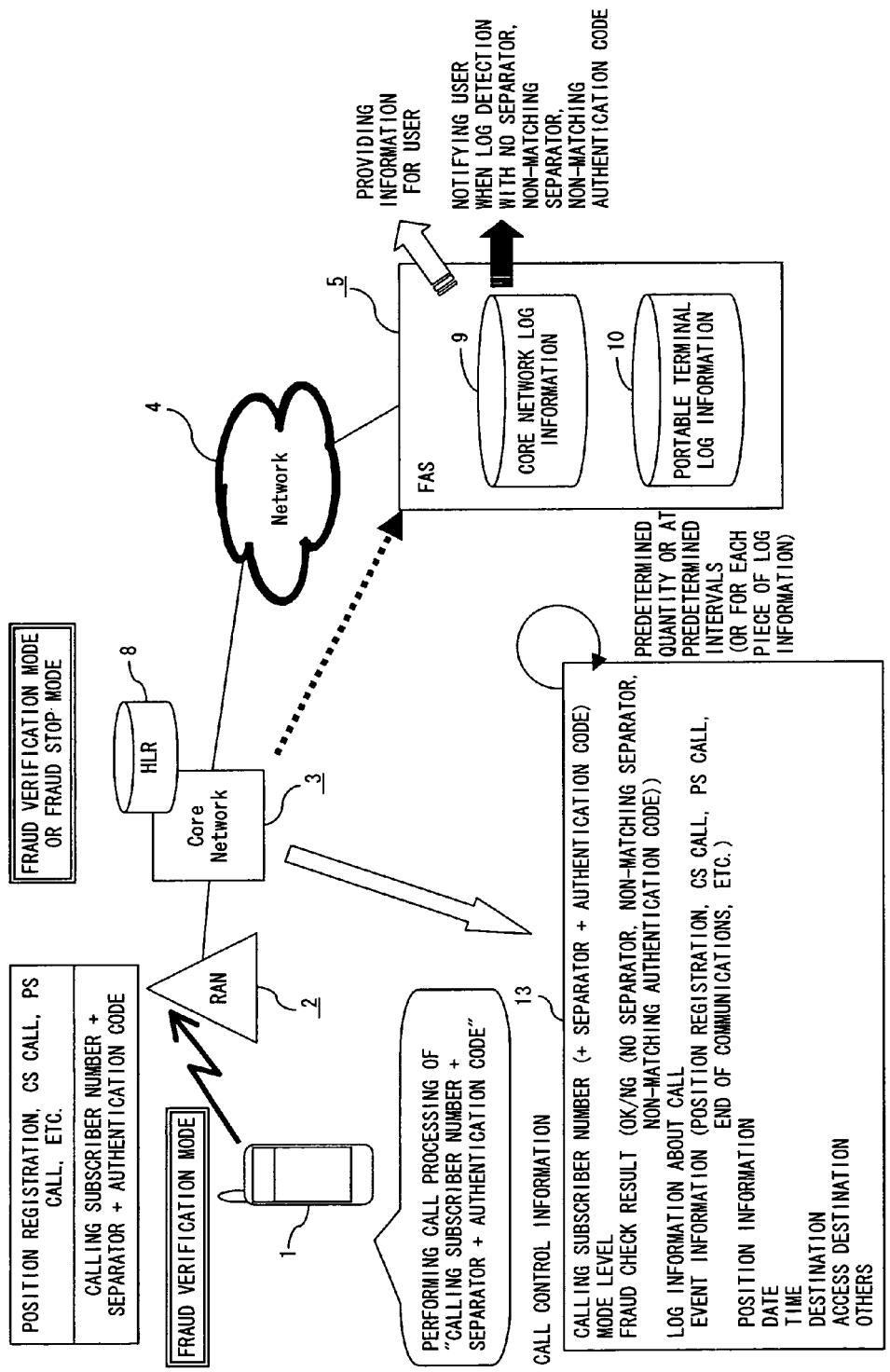
FIG. 6 shows the concept of the subscriber identifying process in the fraud verification mode or the fraud stop mode of the wireless communications unauthorized use verification system according to an embodiment of the present invention.

FIG. 6 shows the concept of the subscriber identifying process when the wireless communications unauthorized use verification system according to the present embodiment enters the fraud verification mode or the fraud stop mode.

The subscriber identifying process shown in FIG. 6 is a process of identifying a call from the UE 1 owned by the subscriber registered in the HLR 8 in the fraud verification mode or the fraud stop mode.

When the UE 1 in the wireless communications unauthorized use verification system according to the present embodiment makes a call to perform position registration or issue a CS call or a PS call, etc. in the fraud verification mode or the fraud stop mode, it reads a separator registered in advance at a predetermined address of the separator information storage unit 19 and an authentication code registered in advance at an address of the fraud audit information storage unit 17, and transmits the data added to a calling subscriber number to the core network 3 through the RAN 2.

Upon receipt of a calling subscriber number (including a separator and an authentication code) by a call from the UE 1, the core network 3 reads a separator and a authentication code corresponding to the received calling subscriber number from a predetermined address of HLR8, and compares the separator and the authentication code transmitted from the UE 1 with the separator and the authentication code read from the HLR 8.

When the comparison outputs a non-matching result, or a separator and a authentication code transmitted from the UE 1 is not added to the calling subscriber number, the core network 3 determines the call transmitted from the UE 1 as an illegal call.

If it is determined that the call from the UE 1 is an illegal call when the core network 3 is a fraud verification mode, then the core network 3 ignores the separator and an authentication code added to the calling subscriber number and performs a normal call control process and simultaneously, for example, automatically records the communications contents when the communications of an illegal call is a CS call. When it is a PS call, it automatically performs monitoring a communications packet and stores the communications contents in the storage unit 24 of the core network 3.

When the core network 3 is in the fraud stop mode, and a call from the UE 1 is determined to be an illegal call, the core network 3 rejects a call from the UE 1. In this case, for example, the communications can be disconnected after a predetermined message (for example, a rejection message for a call), or the UE 1 can simply ignore (do not respond to) the call from the core network 3.

Furthermore, the core network 3 generates the call control information 13 shown in the figure based on the call from the UE 1, and transmits it to the FAS 5.

As shown in the figure, the call control information 13 includes at least a calling subscriber number to which a separator and a authentication code are added, a mode level indicating the fraud audit mode of the core network 3, a fraud detection result (for example, OK when a call from the UE 1 is not an illegal call, NG when it is an illegal call, and the reason for the determination as an illegal call such as no separator, non-matching separator, non-matching authentication code, etc. when the call is an illegal call) indicating a result by the subscriber identifying process, event information (information indicating which type of call it is, position registration, a CS call, or a PS call, etc.) as the log information of a call, the registered position of the UE 1 when a call is made, the date indicating the date and time on and at which the call is made, the date indicating the day and time when the call is made, the time indicating the communications time, the destination of a CS call, the destination of the access of a PS call.

The FAS 5 stores the call control information 12 shown in FIG. 5 in the portable terminal log information storage unit 10, and simultaneously stores the call control information 13 generated by the core network 3 when the UE 1 makes a call in the core network log information storage unit 9.

Then, the FAS 5 refers to the data of a fraud detection result from the call control information 13 stored in the core network log information storage unit 9, and checks whether or not the fraud has been detected.

That is, the FAS 5 reads and refers to the data of the area storing the fraud detection result contained in the call control information 13 from a predetermined address of the core network log information storage unit 9. When data other than OK is stored, it is determined that an abnormality has been detected, and a notification that abnormality has been detected and the wireless communications unauthorized use verification system notifies an administrator, an operator, etc. of the wireless communications unauthorized use verification system of the FAS 5 of the information, for example, that the abnormality has been detected in the display unit not shown in the attached drawings but is provided for the FAS 5, and the operator notifies the subscriber of the detection of abnormality.

To simplify the explanation of the wireless communications unauthorized use verification system in the fraud verification mode or the fraud stop mode, the duplicate processes in FIGS. 5 and 6 are omitted, but the wireless communications unauthorized use verification system in the fraud verification mode and the fraud stop mode is provided with the processes shown in FIGS. 5 and 6.

Figure 7:
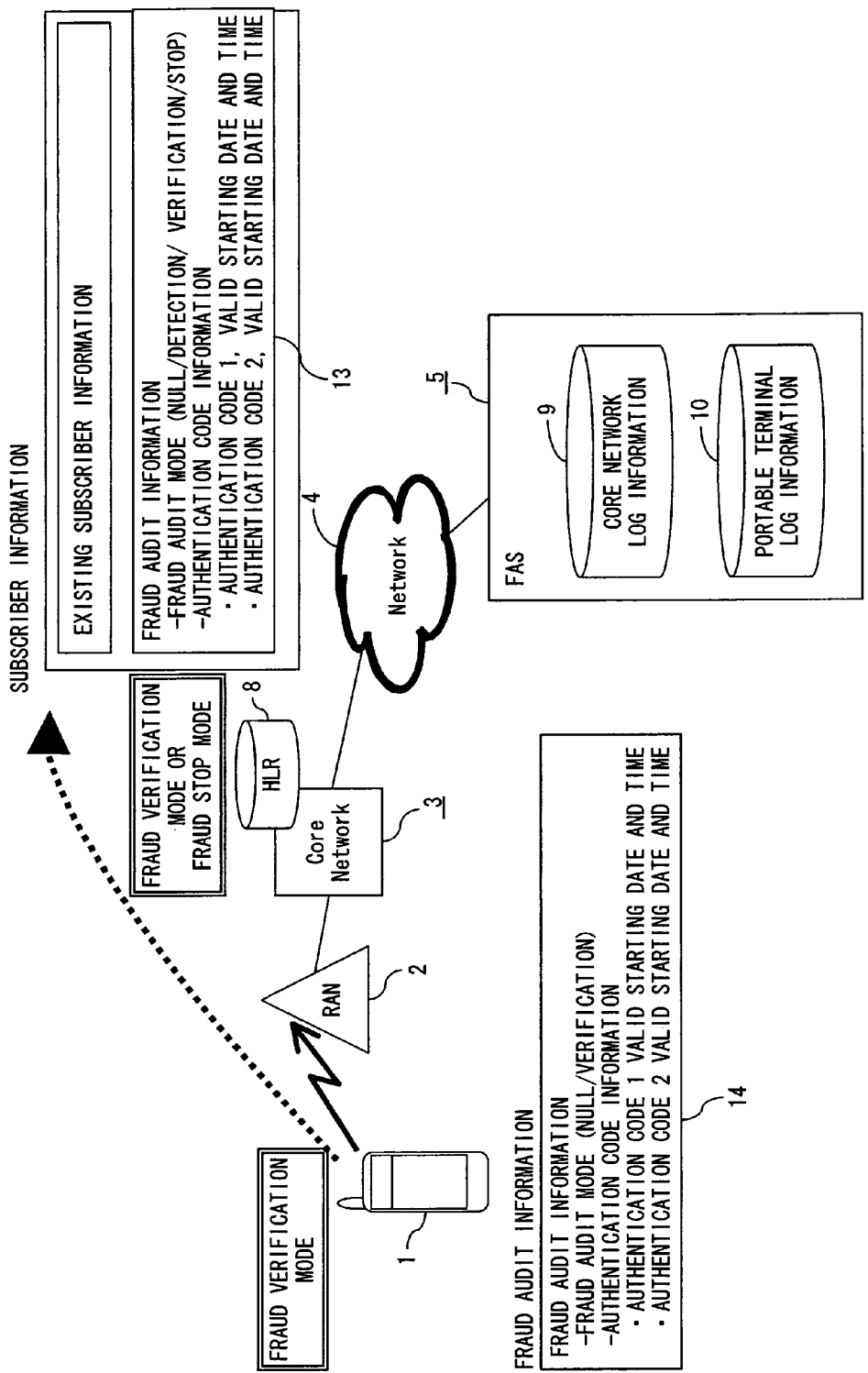
FIG. 7 shows the concept of the setting process of the authentication code according to an embodiment of the present invention.

FIG. 7 shows the concept of the process of setting an authentication code according to the present embodiment.

When the wireless communications unauthorized use verification system is in the fraud verification mode or the fraud stop mode, the UE 1 is set the fraud verification mode as shown in FIG. 3.

The call control information 13 shown in FIG. 7 is stored at a predetermined address of the HLR 8, and fraud audit information 14 is stored in advance at a predetermined address of the fraud audit information storage unit 17 (refer to FIG. 15) in the UE 1.

For example, when a subscriber newly joins the wireless communications unauthorized use verification system according to the present embodiment, an administrator, etc. of the wireless communications unauthorized use verification system or the core network 3 registers new subscriber information in the HLR 8, and simultaneously the HLR 8 also registers also call control information 13 (fraud audit mode, separator managed by the core network 3, authentication code arbitrarily determined by a subscriber), and the call control information 13 registered in the core network 3 is also registered in the fraud audit information storage unit 17 of the UE 1 using dedicated software, etc.

The call control information 13 shown in FIG. 7 comprises a fraud audit mode (normal mode, fraud detection mode, fraud verification mode, and fraud stop mode) and authentication code information formed by a plurality of authentication codes, and the authentication code information is formed by plural sets of data, and each set comprises, for example, an authentication code (authentication code 1 and authentication code 2) and a valid starting date and time (valid starting date and time shown in FIG. 7) on and at which the authentication code becomes valid.

Similarly, the fraud audit information 14 shown in FIG. 7 comprises the fraud audit mode (normal mode, fraud verification mode) and the authentication code information formed by a plurality of authentication codes. The authentication code information is, for example, data of plural sets each of which comprises an authentication code (authentication code 1 and authentication code 2 shown in FIG. 7) and a valid starting date and time (the valid starting date and time shown in FIG. 7) on and at which the authentication code becomes valid.

When the operator of the UE 1 sets and changes the authentication code, for example, the application for fraud audit stored in the storage unit 46 (for example, EEPROM, etc.) provided in the UE 1 is first activated and operated.

For example, the UE 1 displays variable fraud audit information on the display unit according to the application for fraud audit. The operator selects an item to be set from the displayed fraud audit information, and inputs an authentication code and a valid starting date and time.

When the operator completes inputting the authentication code and the valid starting date and time, the UE 1 starts communications with the core network 3, transmits the input authentication code and valid starting date and time and simultaneously writes data at the corresponding address in the fraud audit information storage unit 17 of the UE 1.

On the other hand, the core network 3 stores the authentication code and the valid starting date and time transmitted from the application for fraud audit in the area storing the fraud audit information about the corresponding UE1 stored in the HLR 8.

In the above-mentioned process, the authentication code of the fraud audit information 14 stored in the fraud audit information storage unit 17 of the UE1, and the authentication code of the call control information 13 stored in the HLR 8 are set In the fraud verification mode, the UE 1 reads the fraud audit mode from the fraud audit information 14 stored at a predetermined address in the fraud audit information storage unit 17 provided in the UE 1, and selectively reads the authentication code, and adds it to the calling subscriber number when a call is made, thereby performing a calling process. That is, the UE 1 compares the date data stored at a predetermined address of the memory not shown in the attached drawings with the valid starting date and time of the fraud audit information 14, selects the valid authentication code (by selecting the authentication code closest to the date data and indicating the passage of the valid starting date and time), adds it to the calling subscriber number, and transmits the result to the core network 3.

On the other hand, in the fraud verification mode and the fraud stop mode, upon receipt of a calling subscriber number when the UE 1 makes a call, the core network 3 reads the call control information 13 from the address of the HLR 8 storing the call control information 13 corresponding to the received calling subscriber number, compares the date data stored at a predetermined address of the memory not shown in the attached drawings with the valid starting date and time of the call control information 13, selects a valid authentication code (closest to the corresponding date data, and indicating the passage of the valid starting date and time), and compares it with the received authentication code.

Figure 8:
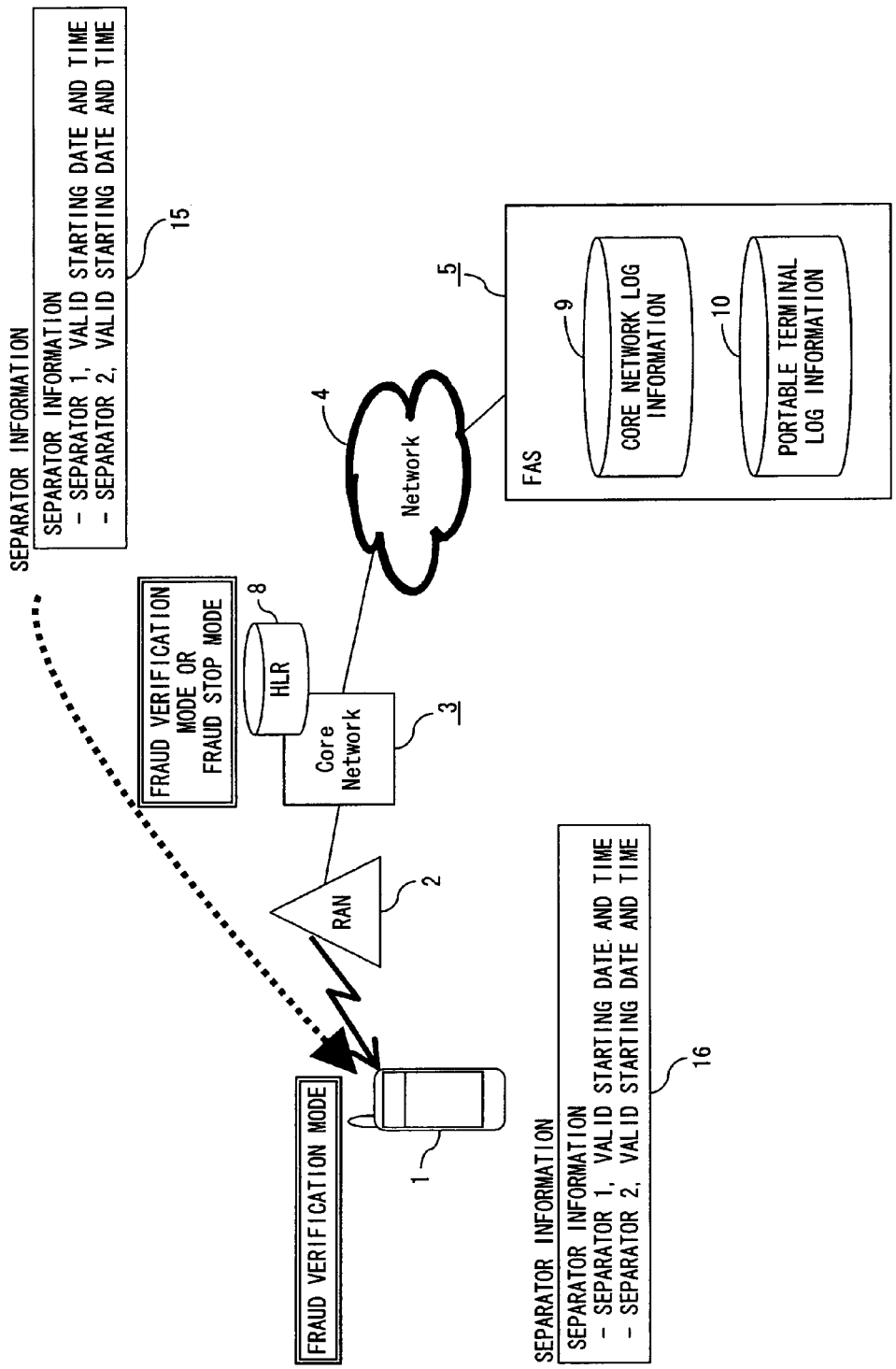
FIG. 8 shows the concept of the changing process of a separator according to an embodiment of the present invention.

FIG. 8 shows the concept of the process of changing the separator according to an embodiment of the present.

Separator information 15 shown in FIG. 8 is stored in advance at a predetermined address of a separator information storage unit 18 provided in the core network 3, and separator information 16 is stored in advance at a predetermined address of the separator information storage unit 19 provided in the UE 1.

The separator information 15 and the separator information 16 shown in FIG. 8 are plural sets of data each set comprising a separator and the valid starting date and time of the separator.

The separator information 15 and the separator information 16 are managed by the core network 3, and automatically or manually changed at predetermined intervals.

For example, the core network 3 obtains separator information to be changed and the changed data automatically or in an operation of an administrator, etc. (input by the input unit), and stores (writes) the changed data at the address at which the separator to be changed in the separator information storage unit 18.

Simultaneously, the core network 3 notifies the UE 1 of the separator information to be changed and the changed data.

The UE 1 stores the separator information and the changed data notified by the core network 3 in the storage unit 46 of the UE 1. Then, the operator of the UE 1 activates the application for fraud audit and sets separator information.

In the fraud verification mode, for example, the UE 1 selectively reads the separator from the separator information 16 stored at a predetermined address of the separator information storage unit 19 of the UE 1, and adds it to the calling subscriber number, thereby performing call processing. That is, the UE 1 compares the date data stored at a predetermined address of the memory not shown in the attached drawings with the valid starting date and time of the separator information 16, selects a valid separator (by selecting the separator which is closest to the date data and indicates the passage of the valid starting date and time), adds it to the calling subscriber number, and transmits it to the core network 3.

On the other hand, in the fraud verification mode and the fraud stop mode, upon receipt of the calling subscriber number by the call from the UE 1, the core network 3 reads the separator information 15 at the address of the separator information storage unit 18 storing the separator information 15 corresponding to the received calling subscriber number, compares the date data stored at a predetermined address of the memory not shown in the attached drawings with the valid starting date and time of the separator information 15, selects the valid separator (selects the separator which is the closest to the date data and indicates the passage of the valid starting date and time, and compares it with the received separator.

The detailed process shown in FIGS. 4 through 8 are explained below by referring to FIG. 9 and the flowcharts shown in FIGS. 10 through 14.

In FIGS. 4 through 8, for comprehensibility of the abstract of the present embodiment, the fraud audit mode is divided into three modes, that is, the fraud detection mode, the fraud verification mode, and the fraud stop mode, but the wireless communications unauthorized use verification system according to the present embodiment explained by referring to FIGS. 10 through 14 has six modes by further dividing the fraud audit mode.

FIG. 9 shows the modes available for the wireless communications unauthorized use verification system.

In FIG. 9, the fraud audit mode according to the present embodiment, the mode setting position indicating the component of the wireless communications unauthorized use verification system in which each mode can be set, and the outline of the process in each mode.

As shown in FIG. 9, the fraud audit mode according to the present embodiment comprises six modes, that is, from the mode M0 to the mode M3+.

The mode M0 is a mode (normal mode) having no fraud audit function (normal mode), and is set in the core network 3 and the UE 1.

The mode M1 is a fraud detection mode shown in FIG. 4, and when the core network 3 detects abnormality by the abnormality detection unit, the mode control information corresponding to the calling subscriber number in which abnormality has been detected is set to M1, and the log collecting process of the storing the call control information 11 generated by the core network 3 in the core network log information storage unit 9 is started.

The mode M2 is a fraud verification mode shown in FIG. 6, and has no function of the call control information collecting process of the UE shown in FIG. 5. In this mode, the administrator, etc. of the wireless communications unauthorized use verification system or the core network 3 sets the mode control information stored at a predetermined address of the storage unit 46 of the UE 1 and the mode control information stored at a predetermined address of the HLR 8 at a request of a subscriber.

The mode M2+ is a fraud stop mode in which only an illegal call shown in FIG. 5 is stopped, and has no function of the call control information collecting of the UE. In this mode, when an illegal call is verified in the M2, the mode control information stored at a predetermined address of the HLR 8 is automatically set. At a request from a subscriber, the administrator, etc. of the wireless communications unauthorized use verification system or the core network 3 manually set the mode control information stored at a predetermined address of the HLR 8.

The mode M3 is a mode having the function of collecting call control information shown in FIG. 5 in addition to the function of the mode M2. As with the mode M2, in this mode, the administrator, etc. of the wireless communications unauthorized use verification system or the core network 3 sets the mode control information stored at a predetermined address of the unit of the UE 1 and the mode control information stored at a predetermined address of the HLR 8 at a request from the subscriber.

The mode M3+ has the function of collecting call control information of the UE shown in FIG. 5 in addition to the function of the mode M3. In this mode, when an illegal call is verified in the mode M3, the mode control information stored at a predetermined address of the HLR 8 is automatically set, and when a request is made from a subscriber, the administrator, etc. of the wireless communications unauthorized use verification system or the core network 3 manually sets the mode control information stored at a predetermined address of the HLR 8.

Figure 10:
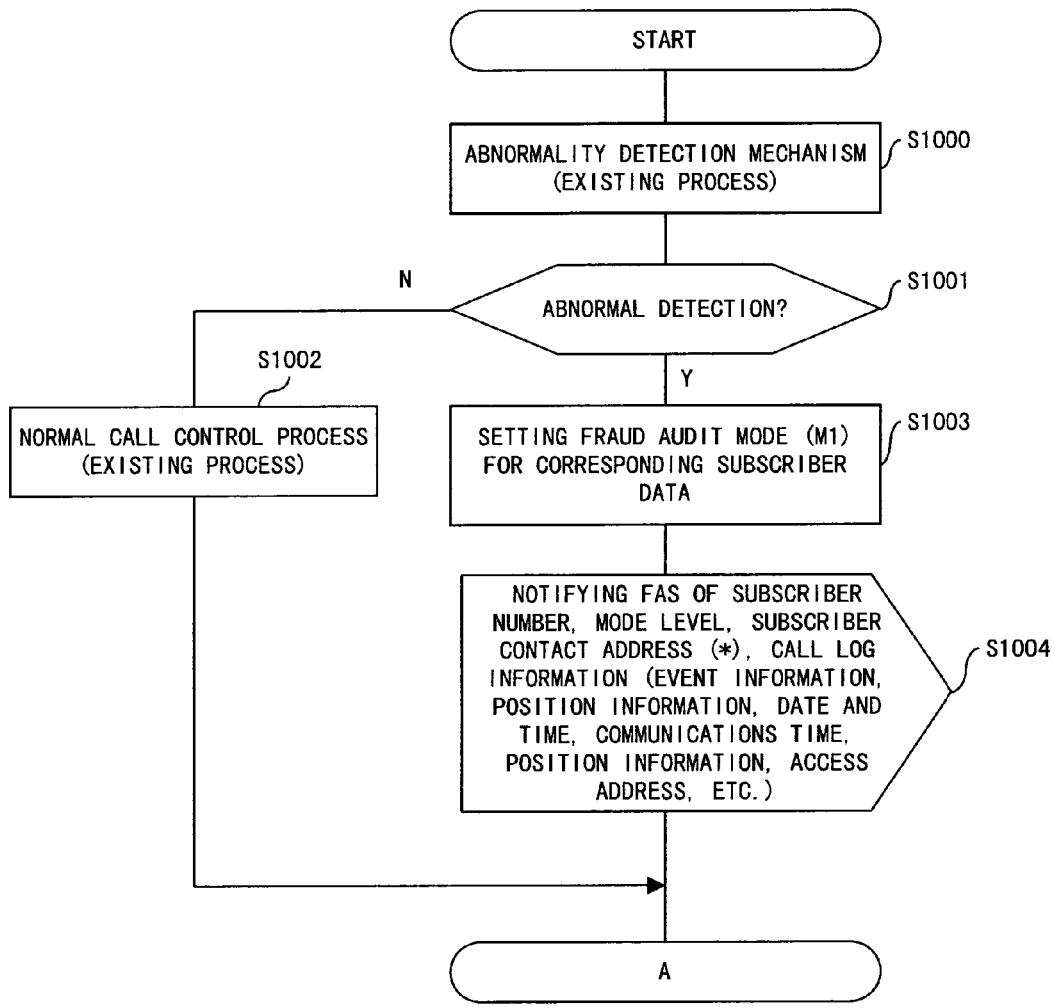
FIG. 10 is a flowchart of the process of call control in the core network according to an embodiment of the present invention.
Figure 11:
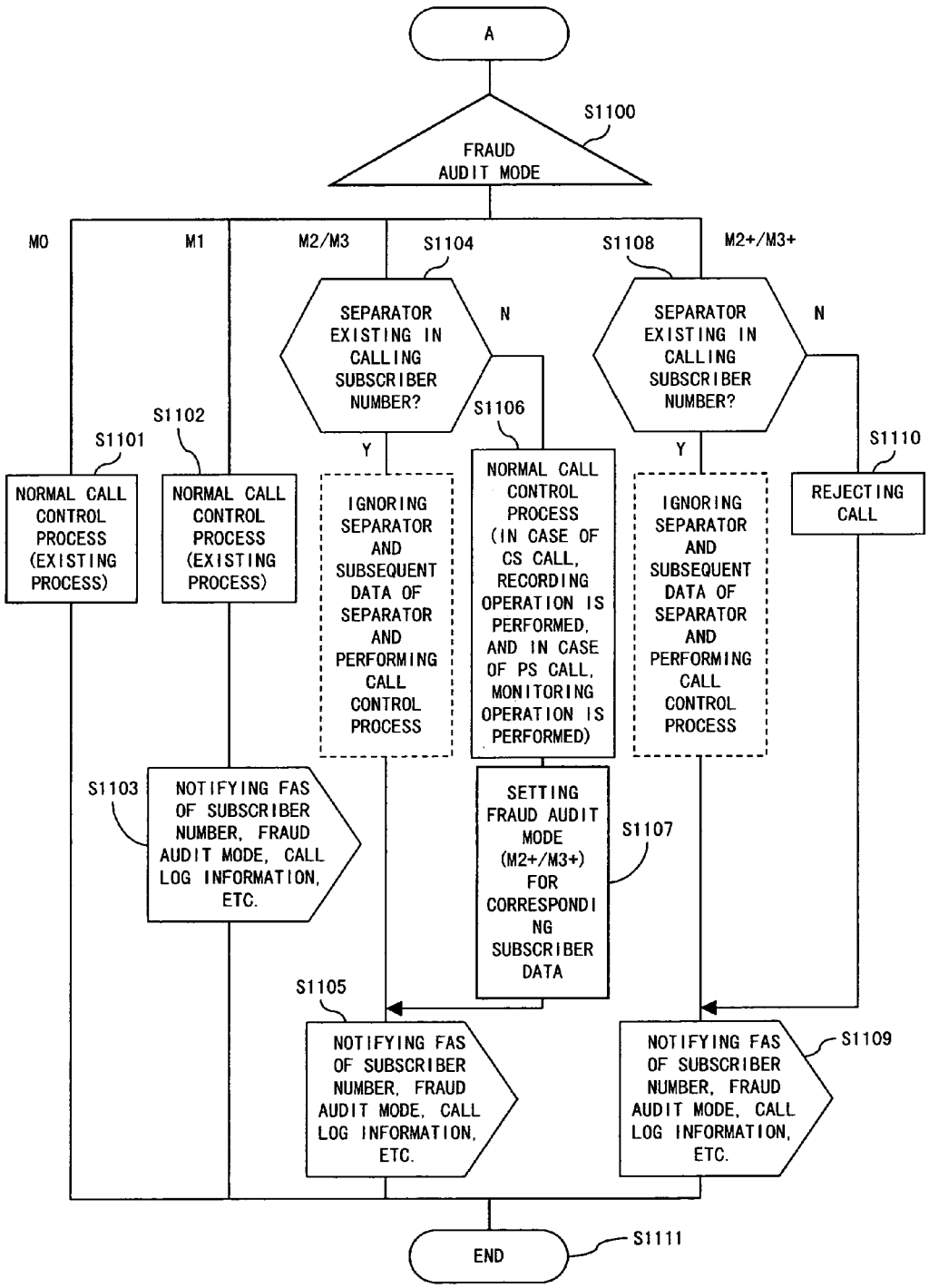
FIG. 11 is a flowchart of the process of call control in the core network according to an embodiment of the present invention.
Figure 12:
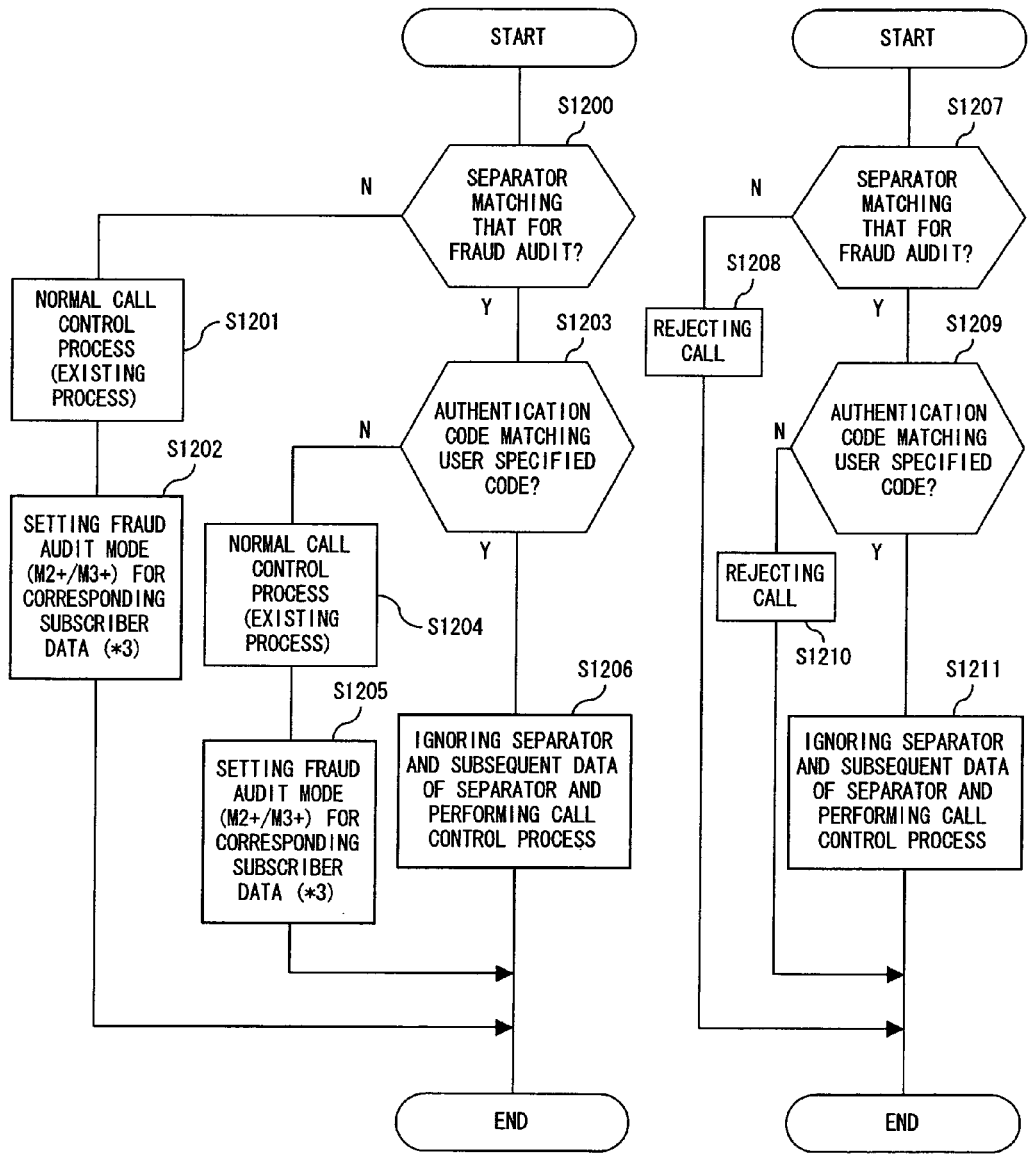
FIG. 12 is a flowchart of the process of call control in the core network according to an embodiment of the present invention.

FIGS. 10 through 12 are flowcharts of the call control process in the core network 3.

In FIG. 10, the core network 3 operates the abnormality detection unit (abnormality detection mechanism) (step S1000) at a request of the UE 1. Then, the abnormality detection unit checks whether or not abnormality has been detected (step S1001). For example, when the abnormality detection unit operating upon receipt of the call from the UE 1 detects abnormality, the data indicating abnormality is stored at a predetermined address of the storage unit of the core network 3 (step S1000). By checking data at any time, it can be determined whether or not abnormality has been detected.

If abnormality is not detected in step S1001, control is passed to step S1002, and a normal call control process is performed.

If abnormality is detected in step S1001, control is passed to step S1003, and the mode M1 is set to the mode control information stored in the HLR 8 corresponding to the detected abnormality call.

When the mode M1 is set to the mode control information, the core network 3 generates as shown in FIG. 4 the call control information 11 depending on the corresponding call, and after it is passed to the FAS 5, control is passed to step S1100 in FIG. 11.

In step S1100 in FIG. 11, it is checked which is the current fraud audit mode in the modes shown in FIG. 9. In this case, the core network 3 reads the mode control information stored at a predetermined address of the storage unit 24, and performs the following processes according to the mode.

In step S1101, when the mode M0 is set, control is passed to step S1101, and the normal call control process is performed.

In step S1100, when the mode M1 is set, control is passed to step S1102, a normal call control process is performed, and control is further passed to step S 1103.

In step S1103, as shown in FIG. 4, the core network 3 receives a call from the UE 1, generates the call control information 11, and transmits it to the FAS 5.

When the mode is M2 or M3 in step S1100, control is passed to step S1104, and the separator of the calling subscriber number transmitted through the call from the UE 1 is checked.

For example, the core network 3 reads a separator from the separator information storage unit 18, compares in pattern the read separator with the calling subscriber number transmitted by the call from the UE 1, thereby successfully making the check. When there is a matching pattern, it is determined that the separator is detected. If there is no matching pattern, it is determined that no separator is detected, or there is an illegal separator.

In step S1104, when a separator is added to the calling subscriber number transmitted from the UE 1, the data subsequent to the separator (in the present embodiment, a separator and an authentication code added to the calling subscriber number) is ignored, and a normal call control process is performed.

Furthermore, in step S1104, if a separator is not added to the calling subscriber number transmitted from the UE 1, control is passed to step S1106, and a normal call control is performed. When the call is a CS call, the contents of the communications are recorded. When it is a PS call, the contents of the communications are monitored (recorded).

When the process in step S1106 is completed, the mode control information stored in the data area of the subscriber corresponding to the call of the HLR 8 is set to M2+ or M3+ (when the current mode is M2, it is set to M2+, and when the current mode is M3, it is set to M3+).

In step S1105, as shown in FIG. 5, the core network 3 generates call control information in response to the call from the UE 1, and transmits it to the FAS 5.

In step S1100, when the mode is M2+ or M3+, control is passed to step S1108, and the separator of the calling subscriber number transmitted through a call from the UE 1 is checked.

In this case, as in the process in step S1104, for example, the core network 3 reads a separator from the separator information storage unit 18, and the read separator is compared in pattern with the calling subscriber number transmitted through a call from the UE 1, thereby correctly performing a check.

In step S1108, when a separator is added to the calling subscriber number transmitted from the UE 1, the data subsequent to the separator (in the present embodiment, a separator and an authentication code added to the calling subscriber number) is ignored, and a normal call control process is performed.

Furthermore, in step S1108, if a separator is not added to the calling subscriber number transmitted from the UE 1, control is passes to step S1110, and the corresponding call is rejected. In this case, for example, the communications of the UE 1 which performs an illegal call can be disconnected after a predetermined message (for example, a message of rejecting the call, etc.), or the core network 3 can ignore (does not answer) the call from the UE 1.

In this process, for example, when the core network 3 detects a illegal call, etc. such as cloning, etc., only an illegal call in the calls from subscribers can be stopped without rejection or other influence (without recognition of a user).

In step S1109, the core network 3 generates call control information in response to the call from the UE 1 as in step S 105, and transmits it to the FAS 5.

When the above-mentioned process is completed, the core network 3 passes control to step S1111, the process corresponding to the call from the UE 1 is completed, and the process starts from step S1000 shown in FIG. 10.

In steps S1104 and S1108 shown in the figure, when there is a separator the data subsequent to the separator is ignored, and a normal call control process is performed. Furthermore, as shown in FIGS. 5 and 6, a more reliable recognizing process can be performed by adding an authentication code checking process.

That is, if it is determined in step S1104 that there is a separator, control is passed to step S1200 shown in FIG. 12, and the separator read from the separator information storage unit 18 is compared with the separator transmitted through the call from the UE 1. If the comparison indicates a non-matching result, control is passed to step S1201 and a normal call control process is performed, and the mode control information stored in the data area of the subscriber corresponding to the call of the HLR 8 is set to M2+ or M3+ (when the current mode is M2, M2+ is set, and when the current mode control information is M3, it is set to M3+).

In step S1200, when the separator read from the separator information storage unit 18 matches the separator transmitted through the call from the UE 1, control is passed to step S1203, and it is checked whether or not the authentication code added to the calling subscriber number transmitted through the call from the UE 1 matches the authentication code corresponding to the calling subscriber number of the call registered in the HLR 8.

For example, when the core network 3 receives a calling subscriber number transmitted through a call from the UE 1, the authentication code corresponding to the calling subscriber number is read from a predetermined address of the HLR 8, and is processed in the pattern matching process with the authentication code added to the received calling subscriber number, thereby performing a checking process. At this time, when the two authentication codes match in pattern, it is determined that the authentication codes match each other, and when the two authentication codes do not match in pattern, then it can be determined that the authentication codes do not match.

If the authentication codes do not match in step S1203, then control is passed to step S1204, a normal call control process is performed, and the mode control information stored in the data area of a subscriber corresponding to the call of the HLR 8 is set to M2+ or M3+ (when the current mode is M2, M2+ is set, and when the current mode is M3, M3+ is set).

If the authentication codes match each other in step S1203, the data subsequent to the separator (in the present embodiment, the separator and authentication code added to the calling subscriber number) is ignored and a normal call control process is performed, and control is passed to step S1105 shown in FIG. 11.

If it is determined that there is a separator in step S1108 shown in FIG. 11, then control is passed to step S1207, and the separator read from the separator information storage unit 18 is compared with the separator transmitted through the call from the UE 1. If a comparison indicates a non-matching result, control is passed to step S1208, and the call from the UE 1 is rejected. In this case, for example, the UE 1 which makes an illegal call can be disconnected after a predetermined message (for example, a message indicating that the call is rejected, etc.), or the core network 3 can simply ignore (do not respond) the call from the UE 1.

If the separator read from the separator information storage unit 18 matches the separator transmitted through the call from the UE 1 in step S1207, control is passed to step S1209, and it is checked whether or not the authentication code added to the calling subscriber number transmitted from the call of the UE 1 matches the authentication code corresponding to the calling subscriber number of the call registered in the HLR 8.

For example, as in step S1203, when the core network 3 receives a calling subscriber number transmitted through the call from the UE 1, the authentication code corresponding to the calling subscriber number is read from a predetermined address of the HLR 8, thereby realizing the checking process by performing a pattern matching process between the read code and the authentication code added to the received calling subscriber number. At this time, when the two authentication codes match each other, it is determined that the authentication codes match each other. When the patterns of the two authentication codes do not match each other, then it can be determined that the authentication codes do not match each other.

If the authentication codes do not match in step S1209, control is passed to step S1210, and the call is rejected. In this case, as in step S1110 shown in FIG. 11, for example, the UE 1 which made an illegal call can be disconnected after a predetermined message (for example, a message indicating the rejection of the call), or the core network 3 can ignore the call from the UE 1 (does not answer the call).

In step S1209, when the authentication codes match, control is passed to step S1211, and the data after the separator (in the present embodiment, the separator and the authentication code added to the calling subscriber number) are ignored, and the normal call control process is performed, thereby passing control to step S1109 shown in FIG. 11.

In the explanation above, the notification process of the control information to the FAS 5 in steps S1103, S1105, and S1109 is described as performed depending on the call from the UE 1, but the notification process for the FAS 5 can be performed when the control information is temporarily stored in the storage unit 24 and a predetermined capacity is reached. The notification process for the FAS 5 can also be performed at predetermined intervals.

Figure 13:
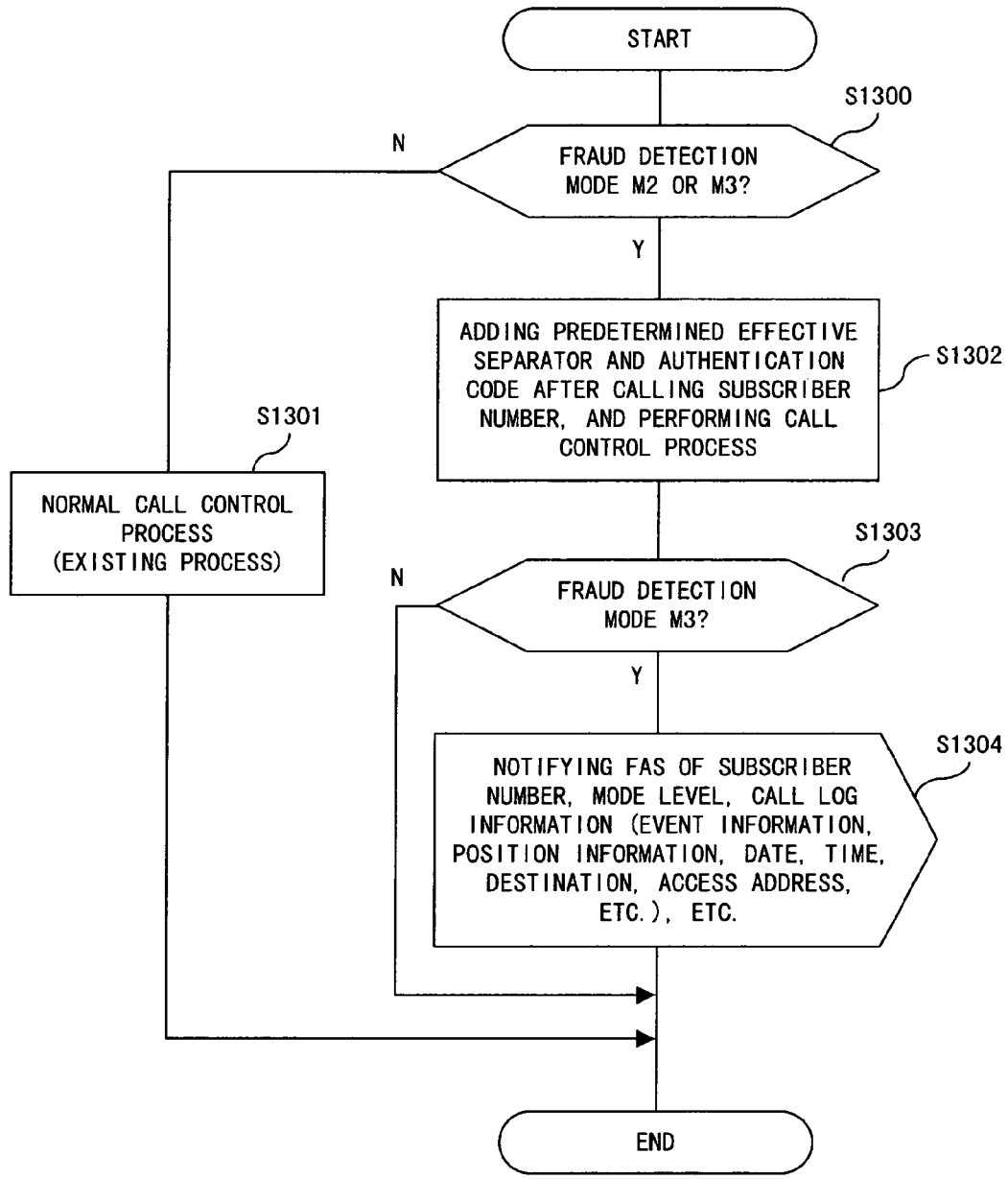
FIG. 13 is a flowchart of the process of call control in the UE according to an embodiment of the present invention.

FIG. 13 is a flowchart of the call control process in the UE 1 according to the present embodiment.

When the call control process starts, in step S1300, the UE 1 refers to the mode control information stored at a predetermined address of the storage unit 46, and checks the current mode.

When the mode is not M2 or M3 in step S1300, control is passed to step S1301, the normal call control process is performed, thereby terminating the process. The UE relating to the present embodiment is provided with the normal mode and the verification mode only as shown in FIG. 3, only three modes, that is, M0, M2, and M3, are prepared.

In step S1300, when the mode is M2 or M3, the UE 1 reads the calling subscriber number stored at a predetermined address of the storage unit provided in the UE 1, reads a valid separator from the separator information storage unit 19, then reads a valid authentication code from the fraud audit information storage unit 17, sequentially adds a separator and an authentication code to the calling subscriber number, thereby performing the call control.

In step S1303, when the mode is not M3, the call control process terminates, and the process is started again from step S1300.

In step S1303, when the mode is M3, the portable terminal call control information 12 is generated as shown in FIG. 5, transmitted to the FAS 5, thereby terminating the call control process, and restarting the process from step S1300.

It is explained that the control information notification process to the FAS 5 in step S1304 is performed at a call from the UE 1, but the notification process to the FAS 5 can also be performed after temporarily storing control information in the 46, and a predetermined capacity is reached. It is also possible to perform the notification process to the FAS 5 at predetermined intervals.

Figure 14:
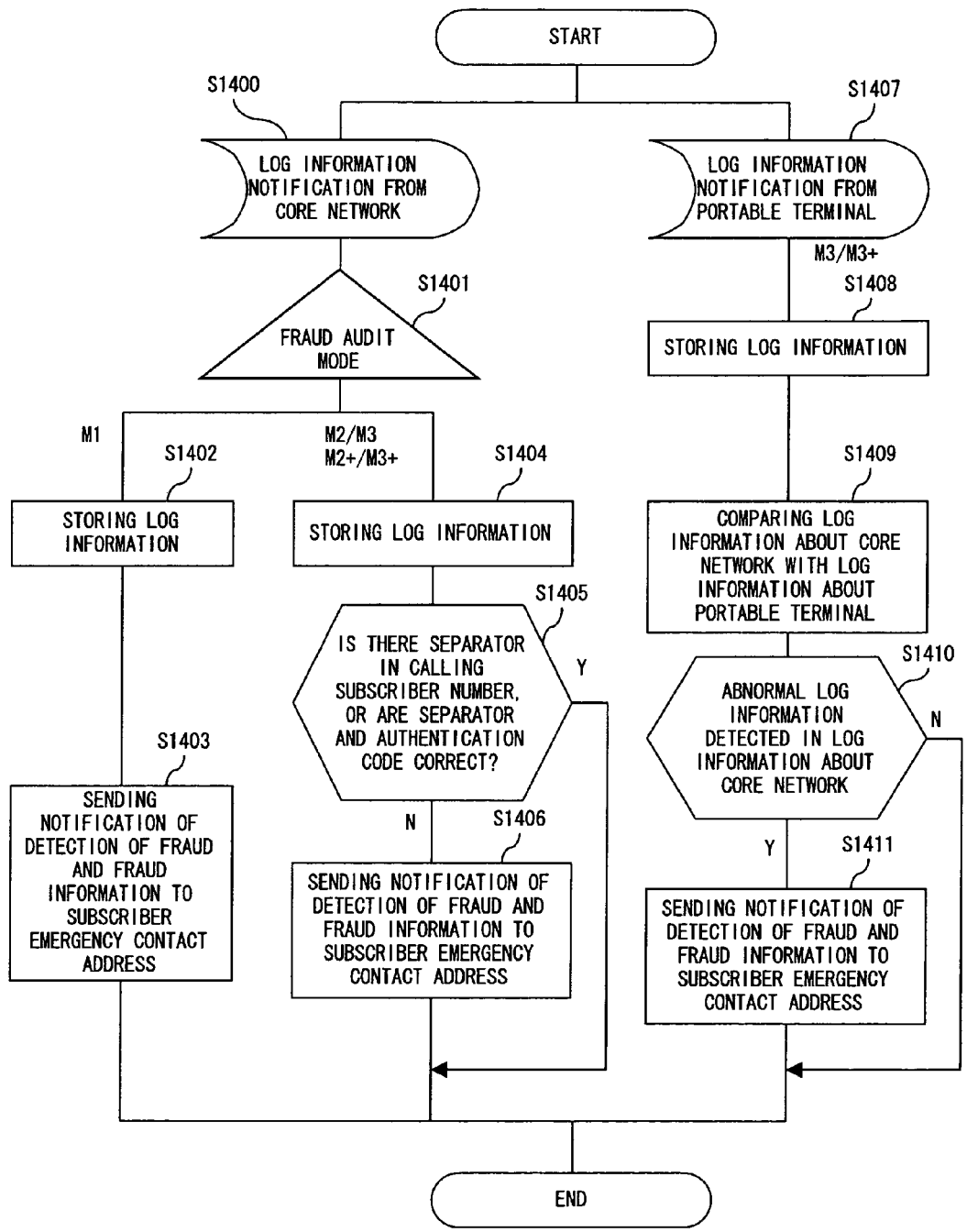
FIG. 14 is a flowchart of the process in the FAS according to an embodiment of the present invention.
Figure 15:
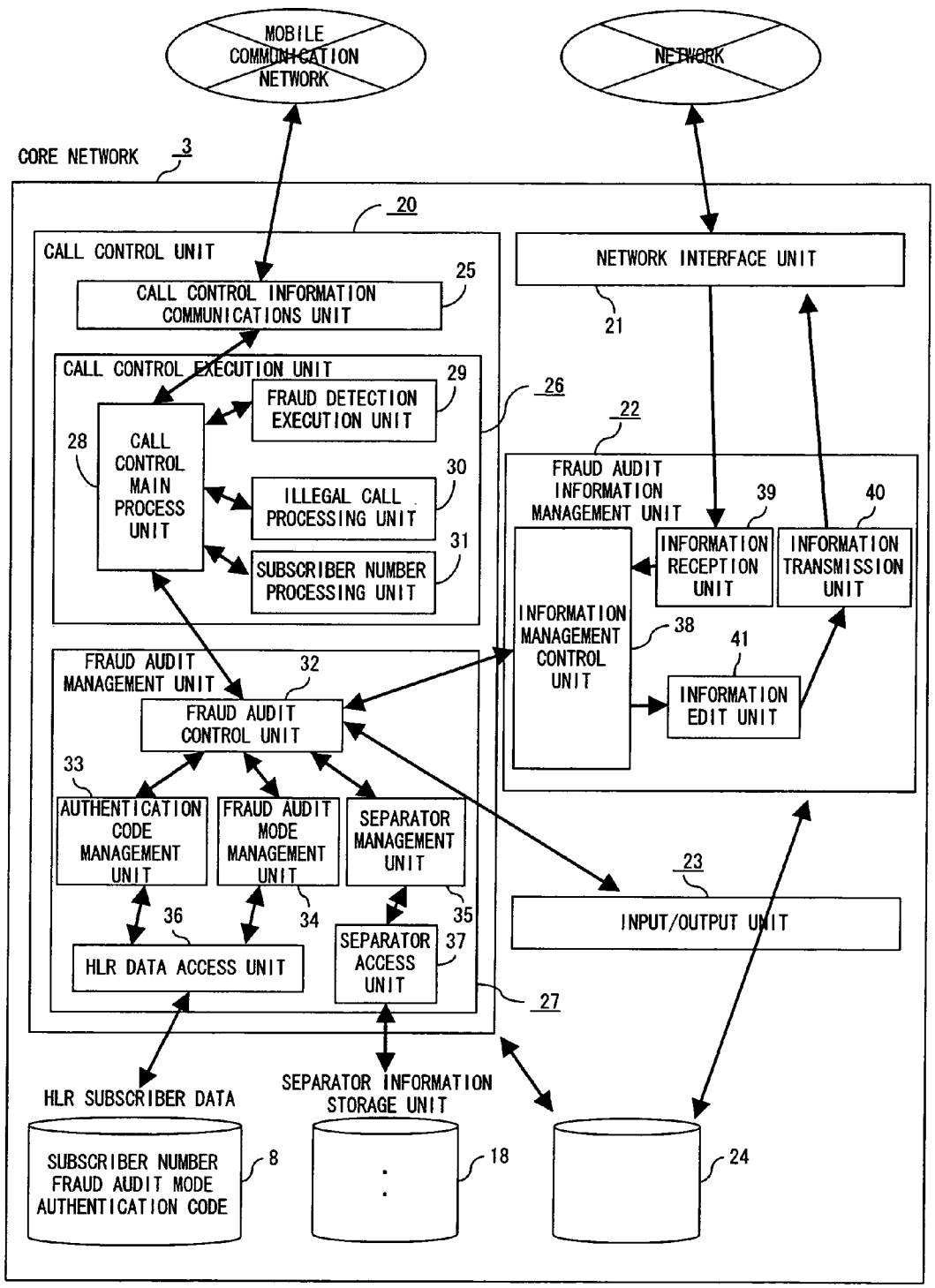
FIG. 15 shows the configuration of the function of the core network according to an embodiment of the present invention.

FIG. 14 is a flowchart of the process in the FAS 5 according to the present embodiment.

In step S1400, as shown in FIG. 4 or 6, when the core network 3 receives call control information generated at a call from the UE 1, FAS 5 refers to the mode level from the received call control information, and determines the current fraud audit mode (step S1401).

In step S1401, when the mode is M1, control is passed to step S1402, and the received call control information 11 is stored in the core network log information storage unit 9, and control is further passed to step S1403.

In step S1403, FAS 5 refers to the fraud check result from the call control information 11, and when an illegal call is detected, a notification is displayed on, for example, a display unit in the FAS 5 that fraud has been detected, thereby allowing an administrator or an operator of the wireless communications unauthorized use verification system or the FAS 5 to recognize the fraud.

Then, the administrator, etc. transmits a notification to the subscriber emergency contact address registered in advance in the storage unit 74 of the HLR 8 or the FAS 5 that fraud has been detected, and about the information relating to a illegal call.

In step S1401, is the mode is any of M2, M3, M2+, and M3+, control is passed to step S1404, and the received call control information 13 is stored in the core network log information storage unit 9

Then, in step S1405, a fraud detection result is referred to from the call control information 13 stored in the core network log information storage unit 9, and a check result of a separator and a authentication code added to the calling subscriber number transmitted when a call is made to the core network 3 from the UE 1 (for example, the fraud detection result stores the presence/absence of a separator to be added to the calling subscriber number, or a comparison result, etc. of a separator or a authentication code).

In step S1405, when no separator is added to a calling subscriber number in the fraud detection result, or a separator and a authentication code are fraud in a fraud detection result, control is passed to step S1506, and as in step S1403, for example, a notification that fraud has been detected is displayed on the display unit of the FAS 5, thereby allowing the administrator, etc. to recognize it. The administrator, etc. transmits a notification to a subscriber emergency contact address stored in advance in a storage unit of the HLR 8 or the FAS 5 that fraud has been detected, and about the information relating to an illegal call.

On the other hand, in step S1407, as shown in FIG. 5, upon receipt of the call control information 12 generated when a call is made by the UE 1, the UE 1 stores the call control information 12 in the portable terminal log information storage unit 10 (step S1408), and control is passed to step S1409.

In step S1409, the FAS 5 performs a process of comparing the call control information stored in the core network log information storage unit 9 with the call control information stored in the portable terminal log information storage unit 10.

In step S1410, for example, as a result of the comparison in step S1409, when there is a difference in predetermined information, it is determined that fraud has been detected. If there is no difference, it is determined that no fraud exists. The predetermined information to be compared in this process can be all or a part of a calling subscriber number including a separator and a authentication codes, event information, position information, date, time, destination, access address, etc.

If fraud is detected in step S1410, control is passed to step S1411, and a notification is displayed on, for example, a display unit in the FAS 5, and allows an administrator, etc. to recognize it, and the administrator, etc. notifies the subscriber emergency contact address registered in advance in the storage unit of the HLR 8 or the FAS 5 that the fraud has been detected or about the information relating to the fraud.

In the explanation above, the processes in steps S1409 through S1411 are performed by a trigger not limited to the notification of the call control information 12 from the UE 1. For example, it is performed at predetermined intervals.

The processes in step S1403, step S1406, and S1411 are displayed on the display unit of the FAS 5 that fraud has been detected as the information for an administrator, etc., thereby notifying from the administrator, etc. to a subscriber. However, by registering an electronic mail address in the subscriber emergency contact address, etc., the FAS 5 automatically reads the electronic mail address from a predetermined address of the storage unit 74 in the HLR 8 or the FAS 5 to transmit e-mail to notify a subscriber of the detection of fraud and about the information related to an illegal call. In this case, the subscriber refers to the e-mail from the another terminal 4a of the subscriber, thereby more quickly notifying a subscriber of illegal communications.

FIG. 15 shows the configuration of the core network 3 relating to the present embodiment.

The core network 3 shown in FIG. 15 comprises at least: the image read area 20 for call control such as a CS call, a PS call, a position registration, etc.; the image read area 21 for control of data reception and transmission to the FAS 5 or the UE 1 through a network, the fraud audit information management unit 22 for management of the information about the fraud audit function; the input/output unit 23 for setting a fraud audit mode, a separator, a valid starting date and time from the input/output device; the HLR 8 storing storing a calling subscriber number, mode control information for control of a calling subscriber number and a fraud audit mode, the separator information storage unit 18 storing the separator information; and the storage unit 24 storing a program, etc. required in control of each element forming the core network 3.

Furthermore, the image read area 20 comprises a call control information communications unit 25 for transmission and reception of the call control information through a mobile communications network, a call control execution unit 26 for call control; and a fraud audit management unit 27 for management of a fraud audit function relating to call control.

The call control execution unit 26 comprises: a call control main process unit 28 for a main process of call control depending on the fraud audit mode; a fraud detection execution unit 29 for detection of a illegal call; an illegal call processing unit 30 for rejecting a call when a illegal call is detected, connecting to a administrator terminal, recording of CS call, monitoring of PS call for a suspicious illegal call; and a subscriber number processing unit 31 for a checking process, etc. of "calling subscriber number+separator+authentication code" depending on the fraud audit mode.

The fraud audit management unit 27 comprises: a fraud audit control unit 32 for control of a fraud audit function relating to call control; an authentication code management unit 33 for management of a valid authentication code, etc.; a fraud audit mode management unit 34 for management of a transfer to each mode; a separator management unit 35 for management of a valid separator; an HLR data access unit 36 for an access process to the HLR 8; and a separator access unit 37 for access process to the separator data.

The fraud audit information management unit 22 comprises: an information management control unit 38 for control of information management relating to a fraud audit function (for example, control by temporarily accumulating data and transmitting the data for each quantity, for each period, and for each information).

An information reception unit 39 for reception of information such as a authentication code, etc. from a portable terminal, etc.; an information transmission unit 40 for transmission of information with the FAS 5; and an information edit unit 41 for edition of information to be transmitted to the FAS 5.

FIG. 16 shows the configuration of the function of the UE 1 according to the present embodiment.

The UE 1 shown in FIG. 16 comprises at least: a call control unit 42 for control of a call for CS call, PS call, position registration, etc.; a network interface unit 43 for control of reception and transmission of data to the FAS 5 and the core network 3 over a network; a fraud audit information management unit 44 for management of information about a fraud audit function; an input/output unit 45 for setting a fraud audit mode from an input/output device, and setting an authentication code, a valid starting date and time, etc. over a portable application, etc.; a fraud audit information storage unit 17 storing mode control information, a authentication code, etc. for control of a fraud audit mode; a separator information storage unit 19 storing separator information; and a storage unit 46 storing a program, etc. necessary to control each element forming part of the UE 1.

The call control unit 42 comprises: a call control information communications unit 47 for transmission and reception of call control information over a mobile communications network: a call control execution unit 48 for execution of call control; and a fraud audit management unit 49 for management of a fraud audit function relating to call control.

The call control execution unit 48 comprises: a call control main process unit 50 for main process of call control depending on the fraud audit mode; a subscriber number processing unit 51 for process of "calling subscriber number+separator+authentication code" depending on the fraud audit mode.

The fraud audit management unit 49 comprises: a fraud audit control unit 52 for control of a fraud audit function relating to call control; an authentication code management unit 53 for management of a valid authentication code; a fraud audit mode management unit 54 for management of a fraud audit mode; an separator code management unit 55 for management of a valid separator; and a data access unit 56 for access process to fraud audit information and separator information data.

The fraud audit information management unit 44 comprises: an information management control unit 57 for control of information management relating to a fraud audit function (for example, control of temporarily accumulating data and transmitting the data for each quantity, each interval, and each amount of information) an information reception unit 58 for reception of information such as separator information from the core network 3, etc. an information transmission unit 59 for transmission of information to the FAS 5; and an information edit unit 60 for editing information to be transmitted to the FAS 5.

FIG. 17 shows the configuration of the function of the FAS 5 according to the present embodiment.

The FAS 5 shown in FIG. 17 comprises at least: a log information management unit 61 for management of log information transmitted from the UE 1 and core network 3; an information management unit 62 for management of the information provided for a user; a communications control unit 63 for control of data transmission and reception with the UE 1, the core network 3, and user terminal; a core network log information storage unit 9 for storing call control information (for example, the call control information 11 or the call control information 13) to be transmitted from the core network 3; and a portable terminal log information storage unit 10 for storing call control information (for example, the call control information 12) transmitted from the UE 1.

The log information management unit 61 comprises: a log information reception unit 64 for reception of log information from the UE 1, or the core network 3; a management control unit 65 for control of the information to be transmitted to a user after controlling the database management and analyzing illegal information; a core network log information generation unit 66 for generation of a core network log information database; a portable terminal log information generation unit 67 for generation of a portable terminal log information database; a database comparison unit 68 for comparison between databases; and a database reference unit 69 for reference of databases.

The information management unit 62 comprises: an information management control unit 70 for management and control of information to be provided for a user; an information edit unit 71 for editing information to be provided for a user; an information transmission unit 72 for transmission of information to be provided for a user; and a user request reception unit 73 for reception of an information request from a user.

As described above, according to the present invention, when a subscriber doubts an illegal use such as cloning by a third party, the subscriber can determine and prove whether or not it is a wrong memory, a wrong charge, or an illegal use such as cloning, etc. by simple and definite determination and proof.

If it is determined that an illegal use is performed, only the illegal call can be stopped from the third party without an influence (without aware) of the rejection of a call.

Furthermore, by specifying valid starting date and time, etc. in setting and changing a authentication code through an application provided for the UE 1, an illegal call can be detected and stopped with higher precision.

By synchronization of call control information of a separator, etc. on the UE 1 and the core network 3 so that a change can be arbitrarily and periodically made, an illegal call can be detected and stopped with higher precision.

As described above, a high-value billing on a user can be determined and proved by a user whether is a wrong memory, a wrong billing, or cloning. Therefore, the subscriber can improve the reliability.

Furthermore, the method for call control with a separator and a authentication code added to a calling subscriber number can be widely applied with user identification and restriction required when a service is offered in addition to a fraud audit function by cooperation and synchronization of a separator and a code between portable terminals and core networks.

What is claimed is:

1. A fraud verification apparatus, comprising:
an abnormality detection unit detecting abnormal communications by a portable terminal for performing wireless communications;
a subscriber information storage unit storing subscriber identification information for identifying a subscriber of a wireless communications system, authentication information used for an authentication of the subscriber, and a separator for separating the subscriber identification information from the authentication information;
a separator management unit changing the separator at predetermined intervals or as needed, and notifying the separator to the portable terminal; and
a fraud verification unit verifying whether or not the abnormal communications detected by the abnormality detection unit are communications based on an illegal call according to a comparison result between the subscriber identification information, the separator and the authentication information stored in the portable terminal and included in call control information transmitted when the portable terminal makes a call and the subscriber identification information, the separator and the authentication information stored in the subscriber information storage unit, and detecting the illegal call from a verification result.

2. The apparatus according to claim 1, wherein
when the illegal call is detected, the fraud verification unit further comprises a call record unit recording communications based on the illegal call.

3. The apparatus according to claim 1 further comprising
a fraud stop unit rejecting illegal communications detected by the fraud detection unit.

4. The apparatus according to claim 1, further comprising:
an abnormality notification unit notifying the subscriber of the wireless communications system of the detection of abnormal communications when the abnormal communications are detected by the abnormality detection unit.

5. A fraud verification apparatus, comprising:
an abnormality detection unit detecting abnormal communications by a portable terminal for performing wireless communications;
a subscriber information storage unit storing information about a subscriber of a wireless communications system;
an abnormality notification unit notifying a subscriber of the wireless communications system of the detection of abnormal communications when the abnormal communications are detected by the abnormality detection unit;
a fraud verification unit verifying whether or not the abnormal communications detected by the abnormality detection unit at a request from the subscriber are the communications based on an illegal call according to a comparison result between call control information generated and transmitted when the portable terminal makes a call and information about the subscriber stored in the subscriber information storage unit, and notifying the subscriber of a verification result; and
a fraud stop unit rejecting illegal communications detected by the fraud detection unit, wherein:
the abnormality notification unit, the fraud verification unit, and the fraud stop unit are selectively switched depending on mode control information stored in a subscriber information storage unit in the fraud verification apparatus;
the mode control information comprises:
an abnormality notification mode set when the abnormality detection unit detects abnormal communications;
a fraud verification mode set at a request of the subscriber; and
a fraud stop mode set at a request of the subscriber or when the fraud verification unit detects illegal communications, wherein
in the abnormality notification mode, the abnormality notification unit notifies the subscriber that abnormal communications are detected;
in the fraud verification mode, the fraud verification unit performs verification based on a comparison result between the call control information and information about the subscriber; and
in the fraud stop mode, the fraud stop unit rejects illegal communications detected by the fraud verification unit.

6. The apparatus according to claim 5, wherein
a call control with the portable terminal in the fraud verification mode, and the fraud stop mode is performed regardless of the separator and the authentication code.

7. A fraud verification apparatus, comprising:
a first storage unit storing first call control information including first subscriber identification information for identifying a first subscriber of a first wireless communications system, first authentication information used for an authentication of the first subscriber, and a first separator for separating the first subscriber identification information and the first authentication information, the first call control information being transmitted by a first portable terminal for performing wireless communications when the first portable terminal makes a call;

a second storage unit storing second call control information including second subscriber identification information for identifying a second subscriber of a second wireless communications system, second authentication information used for the authentication of the second subscriber, and a second separator for separating the second subscriber identification information and the second authentication information, the second call control information being generated when a call from a second portable terminal is received;

a separator management unit changing the separator at predetermined intervals or as needed, and notifying the separator to the portable terminal; and a fraud verification unit comparing the first call control information stored in the first storage unit with the second call control information stored in the second storage unit, verifying based on the comparison result whether or not abnormal communications are performed, and detecting an illegal call from a verification result.

8. A fraud verification apparatus, comprising:
a first storage unit storing first call control information generated and transmitted by a first portable terminal for performing wireless communications when the first portable terminal makes a call;
a second storage unit storing second call control information generated when a call from a second portable terminal is received; and
a fraud verification unit comparing at a request from a subscriber of the wireless communications system call control information stored in the first storage unit with call control information stored in the second storage unit, verifying based on the comparison result whether or not abnormal communications are performed, and notifying the subscriber of a verification result, wherein
the verification result is convened into a format in which the verification result can be referred to from an information processing terminal connected to the apparatus such that the terminal can communicate with the fraud verification apparatus.

9. A fraud verification method, comprising:
an abnormality detection process of detecting abnormal communications by a portable terminal for performing wireless communications;
a subscriber information storage process of storing subscriber identification information for identifying a subscriber of a wireless communications system, authentication information used for an authentication of the subscriber, and a separator for separating the subscriber identification information from the authentication information;
a separator management process of changing the separator at predetermined intervals or as needed, and notifying the separator to the portable terminal; and
a fraud verification process of verifying whether or not the abnormal communications detected in the abnormality detection process are communications based on an illegal call according to a comparison result between the subscriber identification information, the separator and the authentication information stored in the portable terminal and included in call control information transmitted when the portable terminal makes a call and the subscriber identification information, the separator and the authentication information stored in the subscriber information storage process, and detecting the illegal call from a verification result.

10. The method according to claim 9, wherein
when the illegal call is detected, a call recording process with records communications based on the illegal call is performed.

11. The method according to claim 9, further comprising
a fraud stopping process of rejecting illegal communications detected in the fraud detecting process is performed.

12. A fraud verification method, comprising:
an abnormality detection process of detecting abnormal communications by a portable terminal for performing wireless communications;
a subscriber information storage process of storing information about a subscriber of a wireless communications system;
an abnormality notification process of notifying the subscriber of the wireless communications system of the detection of abnormal communications when the abnormal communications are detected in the abnormality detection process;
a fraud verification process of verifying whether or not the abnormal communications detected in the abnormality detection process at a request from the subscriber are communications based on an illegal call according to a comparison result between call control information generated and transmitted when the portable terminal makes a call and information about the subscriber stored in the subscriber information storage process, and notifying the subscriber of a verification result; and
a fraud stooping process of rejecting illegal communications detected in the fraud detecting process is performed, wherein:
the abnormality notifying process, the fraud verifying process, and the fraud stopping process are selectively performed depending on mode control information stored in a subscriber information storage unit;
the mode control information comprises:
an abnormality notification mode set when the abnormality detecting process detects abnormal communications;
a fraud verification mode set at a request of the subscriber; and
a fraud stop mode set at a request of the subscriber or when the fraud verification unit detects illegal communications, wherein
in the abnormality notification mode, the abnormality notifying process notifies the subscriber that abnormal communications are detected;
in the fraud verification mode, the fraud verifying process performs verification based on a comparison result between the call control information and information about the subscriber; and
in the fraud stop mode, the fraud stopping process rejects illegal communications detected in the fraud verifying process.

13. The method according to claim 12, wherein
a call control with the portable terminal in the fraud verification mode, and the fraud stop mode is performed regardless of the separator and the authentication code.

14. A fraud verifying method, comprising
a first storage process of storing first call control information including first subscriber identification information for identifying a first subscriber of a first wireless communications system, first authentication information used for an authentication of the first subscriber, and a first separator for separating the first subscriber identification information and the first authentication information, the first call control information being transmitted by a first portable terminal for performing wireless communications when the first portable terminal makes a call;

a second storage process of storing second call control information including second subscriber identification information for identifying a second subscriber of a second wireless communications system, second authentication information used for the authentication of the second subscriber, and a second separator for separating the second subscriber identification information and the second authentication information, the second call control information being generated when a call from a second portable terminal is received;

a separator management process of changing the separator at predetermined intervals or as needed, and notifying the separator to the portable terminal; and a fraud verification process of comparing the first call control information stored in the first storage process with the second call control information stored in the second storage process, verifying based on the comparison result whether or not abnormal communications are performed, and detecting an illegal call from a verification result.

15. A fraud verifying method, comprising
a fraud verifying process of a first portable terminal for wireless communications comparing first call control information generated and transmitted based on a call from the first portable terminal with second call control information generated based on a call from a second portable terminal at a request from a subscriber of a wireless communications system, verifying whether or not there are illegal communications based on a comparison result, and notifying the subscriber of a verification result, wherein the verification result is converted into a format referred to by an information processing terminal connected to a fraud audit apparatus for communications and is transmitted to the information processing terminal.

16. A program for a fraud verification apparatus directing a CPU of the fraud verification apparatus to perform:
an abnormality detection process of detecting abnormal communications by a portable terminal for performing wireless communications;

a subscriber information storage process of storing subscriber identification information for identifying a subscriber of a wireless communications system, authentication information used for an authentication of the subscriber, and a separator for separating the subscriber identification information from the authentication information;

a separator management process of changing the separator at predetermined intervals or as needed, and notifying the separator to the portable terminal; and a fraud verification process of verifying whether or not the abnormal communications detected in the abnormality detection process are communications based on an illegal call according to a comparison result between the subscriber identification information, the separator and the authentication information stored in the portable terminal and included in call control information transmitted when the portable terminal makes a call and the subscriber identification information, the separator and the authentication information stored in the subscriber information storage process, and detecting the illegal call from a verification result.

17. A program for the fraud verification apparatus according to claim 16, wherein
when the illegal call is detected, a call recording process of recording communications is performed based on the illegal call by a CPU of the fraud verification apparatus.

18. The program according to claim 16, further comprising
a fraud stopping process of rejecting illegal communications detected in the fraud detecting process by the CPU of the fraud verification apparatus.

19. A program for a fraud verification apparatus directing a CPU of the fraud verification apparatus to perform:
an abnormality detection process of detecting abnormal communications by a portable terminal for performing wireless communications;

a subscriber information storage process of storage information about a subscriber of a wireless communications system;

an abnormality notification process of notifying the subscriber of the wireless communications system of the detection of abnormal communications when the abnormal communications are detected in an abnormality detection process;

a fraud verification of verifying whether or not the abnormal communications detected in the abnormality detection process at a request from the subscriber are the communications based on an illegal call according to a comparison result between call control information generated and transmitted when the portable terminal makes a call and information about the subscriber stored in the subscriber information storage process, and notifying the subscriber of a verification result; and a fraud stopping process of rejecting illegal communications detected in the fraud detecting process by the CPU of the fraud verification apparatus, wherein:

the abnormality notifying process, the fraud verifying process, and the fraud stopping process are selectively performed depending on mode control information stored in a subscriber information storage unit;

the mode control information comprises:
an abnormality notification mode set when the abnormality detecting process detects abnormal communications;

a fraud verification mode set at a request of the subscriber; and a fraud stop mode set at a request of the subscriber when the fraud verification unit detects illegal communications, wherein in the abnormality notification mode, the abnormality notifying process notifies the subscriber that abnormal communications are detected;

in the fraud verification mode, the fraud verifying process performs verification based on a comparison result between the call control information and information about the subscriber; and in the fraud stop mode, the fraud stopping process rejects illegal communications detected in the fraud verifying process.

20. The program for the fraud verification apparatus according to claim 19 for directing the CPU in the fraud verification apparatus to perform call control with the portable terminal in the fraud verification mode and the fraud stop mode by disregarding the separator and the authentication code.

21. A program for a fraud verification apparatus used to direct a CPU of the fraud verification apparatus to perform:

a first storage process of storing first call control information including first subscriber identification information for identifying a first subscriber of a first wireless communications system, first authentication information used for an authentication of the first subscriber, and a first separator for separating the first subscriber identification information and the first authentication information, the first call control information being transmitted by a first portable terminal for performing wireless communications when the first portable terminal makes a call;

a second storage process of storing second call control information including second subscriber identification information for identifying a second subscriber of a second wireless communications system, second authentication information used for the authentication of the second subscriber, and a second separator for separating the second subscriber identification information and the second authentication information, the second call control information being generated when a call from a second portable terminal is received;

a separator management process of changing the separator at predetermined intervals or as needed, and notifying the separator to the portable terminal; and a fraud verification process of comparing the first call control information stored in the first storage process with the second call control information stored in the second storage process, verifying based on the comparison result whether or not abnormal communications are performed, and detecting an illegal call from a verification result.

22. A program for a fraud verification apparatus used to direct a CPU of the fraud verification apparatus to perform:

a fraud verifying process of a first portable terminal for wireless communications comparing first call control information generated and transmitted based on a call from the first portable terminal with second call control information generated based on a call from a second portable terminal at a request from a subscriber of a wireless communications system, verifying whether or not there are illegal communications based on a comparison result, and notifying the subscriber of a verification result, wherein the verification result is converted into a format referred to by an information processing terminal connected to a fraud audit apparatus for communications and is transmitted to the information processing terminal.

23. A fraud verification apparatus, comprising:

abnormality detection means for detecting abnormal communications by a portable terminal for performing wireless communications;

subscriber information storage means for storing subscriber identification information for identifying a subscriber of a wireless communications system, authentication information used for an authentication of the subscriber, and a separator for separating the subscriber identification information from the authentication information;

separator management means for changing the separator at predetermined intervals or as needed, and notifying the separator to the portable terminal; and fraud verification means for verifying whether or not the abnormal communications detected by the abnormality detection means are communications based on an illegal call according to a comparison result between the subscriber identification information, the separator and the authentication information stored in the portable terminal and included in call control information transmitted when the portable terminal makes a call and the subscriber identification information, the separator and the authentication information stored in the subscriber information storage means, and detecting the illegal call from a verification result.

24. A fraud verification apparatus, comprising:

first storage means for storing first call control information including first subscriber identification information for identifying a first subscriber of a first wireless communications system, first authentication information used for an authentication of the first subscriber, and a first separator for separating the first subscriber identification information and the first authentication information, the first call control information being transmitted by a first portable terminal for performing wireless communications when the first portable terminal makes a call;

second storage means for storing second call control information including second subscriber identification information for identifying a second subscriber of a second wireless communications system, second authentication information used for the authentication of the second subscriber, and a second separator for separating the second subscriber identification and the second authentication information, the second call control information being generated when a call from a second portable terminal is received; and fraud verification means for comparing the first call control information stored in the first storage means with the second call control information stored in the second storage means, verifying based on the comparison result whether or not abnormal communications are performed, and detecting an illegal call from a verification result.

* * * * *